US009051629B2

(12) United States Patent
Heres et al.

(10) Patent No.: US 9,051,629 B2
(45) Date of Patent: Jun. 9, 2015

(54) PROCESS FOR SEPARATING AMERICIUM FROM OTHER METALLIC ELEMENTS PRESENT IN AN ACIDIC AQUEOUS OR ORGANIC PHASE

(75) Inventors: Xavier Heres, Avignon (FR); Fabien Burdet, Bagnols-sur-Ceze (FR); Julien Borrini, Ternay (FR); Marie-Therese Duchesne, Bollene (FR); Marinella Mazzanti, Saint-Martin-le-Vinoux (FR); Gilles Bernier, Avignon (FR); Stephane Pellet-Rostaing, Villeurbanne (FR); Alain Favre-Reguillon, Montemerle-sur-Saone (FR); Marc Lemaire, Villeurbanne (FR)

(73) Assignees: Commissariat a l'energie atomique et aux energies alternatives, Paris (FR); AREVA NC, Paris (FR)

( * ) Notice: Subject to any disclaimer, the term of this patent is extended or adjusted under 35 U.S.C. 154(b) by 38 days.

(21) Appl. No.: 13/989,749

(22) PCT Filed: Nov. 24, 2011

(86) PCT No.: PCT/EP2011/070909
§ 371 (c)(1),
(2), (4) Date: May 24, 2013

(87) PCT Pub. No.: WO2012/069573
PCT Pub. Date: May 31, 2012

(65) Prior Publication Data
US 2013/0259776 A1 Oct. 3, 2013

(30) Foreign Application Priority Data

Nov. 25, 2010 (FR) ...................................... 10 59749

(51) Int. Cl.
*C22B 60/02* (2006.01)
*C01G 56/00* (2006.01)
(Continued)

(52) U.S. Cl.
CPC .......... *C22B 60/0295* (2013.01); *C22B 60/026* (2013.01); *C01G 56/001* (2013.01); *C22B 3/0012* (2013.01); *G21C 19/46* (2013.01); *G21F 9/12* (2013.01); *G21F 9/125* (2013.01)

(58) Field of Classification Search
USPC ....................................................... 423/9, 10
See application file for complete search history.

(56) References Cited

U.S. PATENT DOCUMENTS 5,708,958 A 1/1998 Koma et al.
7,157,003 B2 1/2007 Baron et al.
(Continued)

FOREIGN PATENT DOCUMENTS

DE 19810895 C1 5/2000
EP 0835673 A2 4/1998
(Continued)

OTHER PUBLICATIONS

Alyapyshev, M. Yu, et al. "New systems based on 2,2'-dipyridyl-6,6'-dicarboxylic acid diamides for Am—Eu separation", Mendeleev Communications, Institute of Physics Publishing, Bristol, GB, vol. 18, No. 6, Nov. 1, 2008, pp. 336-337.
(Continued)

*Primary Examiner* — Melissa Swain
(74) *Attorney, Agent, or Firm* — Nixon Peabody LLP

(57) ABSTRACT

A process which allows separation of americium present in an acid aqueous phase or in an organic phase from the other metal elements also found in this phase, by complexation of the americium with a water-soluble ethylenediamine derivative; and a process for selective recovery of americium from an acid aqueous phase containing, in addition to americium, other metal elements, which comprises the application of this separation process.

26 Claims, 3 Drawing Sheets

(51) Int. Cl.
C22B 3/28 (2006.01)
G21C 19/46 (2006.01)
G21F 9/12 (2006.01)

(56) References Cited

U.S. PATENT DOCUMENTS

| 8,309,058 | B2 | 11/2012 | Mazzanti |
| 2003/0114793 | A1 | 6/2003 | Freyman |
| 2004/0124141 | A1 | 7/2004 | Baron et al. |
| 2006/0079957 | A1 | 4/2006 | Chin et al. |
| 2012/0152059 | A1 | 6/2012 | Heres et al. |
| 2012/0160061 | A1 | 6/2012 | Heres et al. |

FOREIGN PATENT DOCUMENTS

| FR | 2738663 A1 | 3/1997 |
| FR | 2845616 A1 | 4/2001 |
| FR | 2890657 A1 | 3/2007 |
| JP | 11-314920 A | 11/1999 |
| WO | 00/41761 A1 | 7/2000 |
| WO | 2007/135178 A1 | 11/2007 |
| WO | 2008/049807 A1 | 5/2008 |

OTHER PUBLICATIONS

Matsumura, T., et al. "Extraction separation of trivalent minor actinides from lanthanides with hydrophobic derivatives of TPEN", Progress in Nuclear Energy, Pergamon Press, Oxford, GB, vol. 50, No. 2-6, Dec. 21, 2007, pp. 470-475.
Mirvaliev, R., et al. "Selective Separation of Am(III) from Ln(III) with a Novel Synergistic Extraction System, N,N,N', N'-tetrakis(2-methylpyridyl)-ethylenediamine (TPEN) and Carboxylic Acid in 1-Octanol", Journal of Nuclear Science and Technology, vol. 41, No. 11, Nov. 2004, pp. 1122-1124.
Miyashita, S., et al. "Separation of Am(III) from Eu(III) by extraction based on in situ extractant formation of dithiocarbamate derivatives", Progress in Nuclear Energy, Pergamon Press, Oxford, GB, vol. 50, No. 2-6, Dec. 21, 2007, pp. 499-503.
International Search Report for PCT/EP2011/070909 dated Mar. 8, 2012.
Ansari, S.A., et al., "N,N,N',N'-Tetraoctyl Diglycolamide (TODGA): A Promising Extractant for Actinide-Partitioning from High-Level Waste (HLW)", Solvent Extraction and Ion Exchange, 23, pp. 463-479 (2005).
Arai, K., et al., "Modified TRUEX Process for the Treatment of High-Level Liquid Waste", Journal of Nuclear Science and Technology, vol. 34, No. 5, pp. 521-526 (May 1997).
Baron, P., et al., "Separation of the Minor Actinides: The DIAMEX-SANEX Concept", Proceedings of the International Conference GLOBAL'01, Paris, France (2001).
Baron, P., et al., "State of Progress of the Diamex Process", Proceedings of the International Conference GLOBAL'97, Yokohama, Japan (1997).
Bond, E., et al., "The Solvent Extraction of Americium(III) in HCl Solutions by 2,6-BIS[(Diphenylphosphino)Methyl] Pyridine N,P,P'-Trioxide", Solvent Extraction and Ion Exchange, 16(4), pp. 967-983 (1998).
Chaudhary, S.D., et al., "Solvent Extraction of Trivalent Actinides and Lanthanides from Various Aqueous Media Using KSM-17", NUCAR 97: Nuclear and Radiochemistry Symposium. Department of Atomic Energy, Bombay, India (1997).
Chen, J., et al. "A Cross-flow Hot Test for Separating Am from Fission Product Lanthanides by Bis(2,4,4-trimethylpentyl)dithiophosphinic Acid Extraction", Radiochimica Acta, 76, pp. 129-130 (1997).
Christiansen, B., et al., "Advanced aqueous reprocessing in P&T strategies: Process demonstrations on genuine fuels and targets", Radiochim. Acta, 92, pp. 475-480 (2004).

Dhami, P.S., et al., "Studies on the Partitioning of Actinides from High Level Waste Using a Mixture of HDELP and CMPO as Extractant", Separation Science and Technology, 36(2), pp. 325-335 (2001).
Gujar, R. B., et al., "Comparative evaluation of two substituted diglycolamide extractants for 'actinide partitioning'", J. Radioanal. Nucl. Chem. 284, pp. 377-385 (2010).
Gujar, R. B., et al., "Development of T2EHDGA Based Process for Actinide Partitioning. Part 1: Batch Studies for Process Optimization," Solvent Extraction and Ion Exchange, 28, pp. 350-366 (2010).
Koma, Y., et al., "Trivalent f-Element Intra-group Separation by Solvent Extraction with CMPO-complexant System," Journal of Nuclear Science and Technology, vol. 35, No. 2, pp. 130-136 (Feb. 1998).
Kubota, M., et al., "Development of Partitioning Process at JAERI," Third International Information Exchange Meeting on Actinide and Fission Product Partitioning and Transmutation, Cadarache, France, pp. 394-406 (1994).
Kubota, M., et al., "Preliminary Assessment on Four Group Partitioning Process Developed in JAERI," Proceedings of the International Conference GLOBAL'97, Yokohama, Japan, pp. 458-462 (1997).
Law, J. D., et al., "Pilot-Scale TRUEX Flowsheet Testing for Separation of Actinides and Lanthanides from used Nuclear Fuel," Separation Science and Technology, 45, pp. 1769-1775 (2010).
Magnusson, D., et al., "Demonstration of a SANEX Process in Centrifugal Contactors using the CyMe4-BTBP Molecule on a Genuine Fuel Solution," Solvent Extraction and Ion Exchange, 27(2), pp. 97-106 (2009).
Modolo, G., et al., "Demonstration of a TODGA-Based Continuous Counter-Current Extraction Process for the Partitioning of Actinides from a Simulated PUREX Raffinate, Part II: Centrifugal Contactor Runs," Solvent Extraction and Ion Exchange, 26, pp. 62-76 (2008).
Modolo, G., et al., "Thermodynamic Study on the Synergistic Mixture of Bis(chlorophenyl) dithiophosphinic Acid and Tris(2-ethylhexyl) phosphate for Separation of Actinides(III) from Lanthanides(III)," Solvent Extraction and Ion Exchange, 23(3), pp. 359-373 (2005).
Morita, Y., et al., "Actinide Partitioning from HLW in a Continuous DIDPA Extraction Process by Means of Centrifugal Extractors," Solvent Extraction and Ion Exchange, 14(3), pp. 385-400 (1996).
Pathak, P. N., et al., "Use of 3-Phenyl-4-Benzoyl-5-Isoxazolone for the Recovery of Americium(III) from Simulated Nuclear Waste Solution," NUCAR 97: Nuclear and Radiochemistry Symposium, Department of Atomic Energy, Bombay, India, pp. 182-183 (1997).
Peterman, D. R., et al., "Selective Extraction of Minor Actinides from Acidic Media Using Symmetric and Asymmetric Dithiophosphinic Acids," Separation Science and Technology, 45(12), pp. 1711-1717 (2010).
Rao, L., et al., "Synergistic Extraction of Eu(III) and Am(III) by Thenoyltrifluoroacetone and Neutral Donor Extractants: (Carbamoylmethyl) Phosphine Oxide and 2, 6-Bis ((Diphenylphosphino)Methyl)Pyridine N, P, P-Trioxide," Solvent Extraction and Ion Exchange, 16(4), pp. 913-929 (1998).
Reddy, M. L. P., et al., "Mixed-Ligand Chelate Extraction of Trivalent Lanthanides and Actinides with 3-Phenyl-4-Benzoyl-5-Isoxazolone and Neutral Oxo-donors," Radiochimica Acta, 69, pp. 55-60 (1995).
Sasaki, Y., et al., "Extraction Behavior of Actinides and Metal Ions by the Promising Extractant, N, N, N', N'-Tetraoctyl-3, 6-dioxaoctanediamide (DOODA)," Solvent Extraction and Ion Exchange, 28, pp. 335-349 (2010).
Spjuth, L., et al., "Extraction of Actinides and Lanthanides from Nitric Acid Solution by Malonamides," Radiochimica Acta, 78, pp. 39-46 (1997).
Tachimori, S., et al., "Separation of Transplutonium and Rare-Earth Elements by Extraction with Di-isodecyl Phosphoric Acid from DTPA Solution," Journal of Nuclear Science and Technology, 16(6), pp. 434-440 (Jun. 1979).
Tachimori, S., et al, "Solvent Extraction of Alkaline Earth Metal Ions by Diglycolic Amides from Nitric Acid Solutions," Solvent Extraction and Ion Exchange, vol. 21, No. 5, pp. 707-715 (2003).
Weaver, B., et al., "TALSPEAK: A New Method of Separating Americium and Curium from the Lanthanides by Extraction from an

(56) References Cited

OTHER PUBLICATIONS

Aqueous Solution of an Aminopolyacetic Acid Complex with a Monoacidic Organophosphate or Phosphonate," Rapport ORNL-3559 (Aug. 1964).

Yamagawa, J., et al., "Novel Organophosphorus Extractants for the Recycle of Transuranium Elements," Solvent Extraction Research and Development, vol. 4, pp. 12-22, Japan (1997).

Zhu, Y., et al., "Chinese Experience in the Removal of Actinides from Highly Active Waste by Trialkylphosphine—Oxide Extraction," Nuclear Technology, vol. 108, pp. 361-369 (Dec. 1994).

Preliminary Search Report for French Patent Application No. 1059749 dated Jul. 13, 2011.

Notice of Allowance for U.S. Appl. No. 13/386,017 dated Feb. 3, 2014.

Office Action for U.S. Appl. No. 13/386,012 dated Oct. 24, 2013.

Office Action for U.S. Appl. No. 13/386,012 dated Jan. 14, 2013.

International Preliminary Report on Patentability for PCT/EP2011/070909 dated Jun. 6, 2013.

PROCESS FOR SEPARATING AMERICIUM FROM OTHER METALLIC ELEMENTS PRESENT IN AN ACIDIC AQUEOUS OR ORGANIC PHASE

CROSS REFERENCE TO RELATED APPLICATIONS OR PRIORITY CLAIM

This application is a National Phase of PCT/EP2011/070909, filed Nov. 24, 2011, entitled, "PROCESS FOR SEPARATING AMERICIUM FROM OTHER METALLIC ELEMENTS PRESENT IN AN ACIDIC AQUEOUS OR ORGANIC PHASE AND APPLICATIONS THEREOF", which claims the benefit of French Patent Application No. 10 59749, filed Nov. 25, 2010, the contents of which are incorporated herein by reference in their entirety.

TECHNICAL FIELD

The present invention relates to a process which allows separation of americium present in an acid aqueous phase or in an organic phase from other metal elements also found in this phase.

It also relates to a process for selective recovery of americium from an acid aqueous phase containing, in addition to americium, other metal elements, which comprises the application of this separation process.

The invention may be used in the field of processing and recycling irradiated nuclear fuels where it has a most particular interest for recovering americium from aqueous solutions with high activity such as raffinates from the first purification cycle of a PUREX or COEX™ process, which contain americium, curium, possibly californium, as well as fission products including lanthanides but which, on the other hand, are free of uranium, plutonium and neptunium or which only contain these last three elements in trace amounts.

STATE OF THE PRIOR ART

The process, which allow extraction and purification of uranium and plutonium present in the dissolution liquors of irradiated nuclear fuels such as the PUREX process (which is presently used in irradiated nuclear fuel processing plants) and the COEX™ process (which is described in PCT International Application WO 2007/135178, [1]), generate effluents to which the name of raffinates is given.

These raffinates are aqueous solutions with high nitric acidity, typically from 2 to 5 M, which contain americium, curium, lanthanides such as lanthanum, cerium, praseodymium, neodymium, samarium and europium, fission products other than lanthanides like molybdenum, zirconium, rubidium, ruthenium, rhodium, palladium and yttrium, as well as corrosion products such as iron.

Their handling presently consists of concentrating them to a maximum and then of packaging them in glassy matrices with view to temporary storage before ultimate storage.

Americium is the main contributor to residual radioactivity after 300 years of wastes from the packaging of raffinates. As an illustration, the time required for this radioactivity to come back to a level of the same order as that of natural uranium which is used for making nuclear fuels is about 10,000 years.

Selective recovery of americium present in the raffinates, before the latter are sent to vitrification, would therefore allow a significant reduction in the thermal load of the vitrified wastes, and thereby their storage coverage.

Moreover, curium 244 which represents the majority isotope of curium present in nuclear waste is a powerful neutron emitter source of significant radioactivity.

Recovering americium without curium would therefore also simplify the manufacturing, the handling and the transport of assemblies of transmutation fuels containing americium.

It is found that most extractants, the use of which has been proposed for liquid-liquid extractions, does not have pronounced selectivity, or even absolutely no selectivity, towards americium relatively to curium, to lanthanides and to yttrium. This is due to the very great similarity existing between the physicochemical properties of these elements.

The result of this is that it is presently extremely difficult to separate by liquid-liquid extraction, americium from curium on the one hand, and americium from lanthanide and yttrium on the other hand, and that these separations, when they are possible, require, in order to obtain satisfactory separation performances, the use of a high number of stages, which is a penalty from an industrial point of view.

Now, it happened that within the scope of their work, the inventors noticed that:

water-soluble derivatives of ethylenediamine, which have been described as ligands of lanthanides and proposed for making luminescent lanthanide complexes for medical use (reference [2]), have unexpectedly, when they are in acid aqueous solution, a capability of complexing americium which is much greater than the one they have towards curium, lanthanides and a certain number of other fission products including yttrium, and that this capability of complexing americium may notably be utilized for selectively recovering americium from an acid aqueous phase in which it is found together with other metal elements.

And it is on these observations that the present invention is based.

DISCUSSION OF THE INVENTION

Firstly, the object of the invention is therefore a process for separating americium from other metal elements present in a phase P1, which process:

comprises one or more operations each comprising putting the phase P1 into contact with a phase P2 which is not miscible with it, and then separating the phase P1 from the phase P2, one of the phases P1 and P2 being an acid aqueous phase and the other one of these phases being an organic phase which contains at least one extractant in an organic diluent, and is characterized in that the acid aqueous phase contains a derivative of ethylenediamine fitting the general formula (I) hereafter:

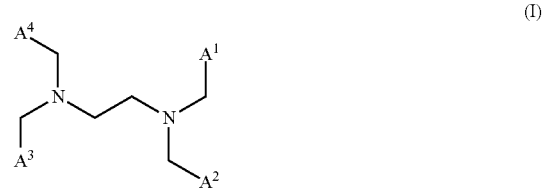

(I)

wherein $A^1$, $A^2$, $A^3$ and $A^4$, which are either identical or different, represent a group of general formula (II) hereafter:

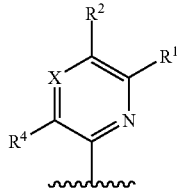

(II)

wherein:

either X represents a nitrogen or sulfur atom, in which case one of $R^1$, $R^2$ and $R^4$ represents a complexing group selected from the groups —COOH, —SO$_3$H, —PO$_3$H$_2$, —CONH$_2$ and —CON(CH$_3$)$_2$, while the other ones of $R^1$, $R^2$ and $R^4$ represent, independently of each other, a hydrogen atom or a group selected from the groups —OH, —NH$_2$, —N(CH$_3$)$_2$, —COOH, —COOCH$_3$, —CONH$_2$, —CON(CH$_3$)$_2$, —SO$_3$H, —SO$_3$CH$_3$, —PO$_3$H$_2$, —PO(OCH$_3$)$_2$, —O(CH$_2$CH$_2$)$_n$—OH and —O(CH$_2$CH$_2$)$_n$—OCH$_3$ wherein n is an integer equal to or greater than 1;

or X represents a carbon atom bearing a hydrogen atom or a group $R^3$, in which case one of $R^1$, $R^2$, $R^3$ and $R^4$ represents a complexing group selected from the groups —COOH, —SO$_3$H, —PO$_3$H$_2$, —CONH$_2$ and —CON(CH$_3$)$_2$, while the other ones of $R^1$, $R^2$, $R^3$ and $R^4$ represent, independently of each other, a hydrogen atom or a group selected from the groups —OH, —NH$_2$, —N(CH$_3$)$_2$, —COOH, —COOCH$_3$, —CONH$_2$, —CON(CH$_3$)$_2$, —SO$_3$H, —SO$_3$CH$_3$, —PO$_3$H$_2$, —PO(OCH$_3$)$_2$, —O(CH$_2$CH$_2$)$_n$—OH and —O(CH$_2$CH$_2$)$_n$—OCH$_3$ wherein n is an integer equal to or greater than 1; or a salt thereof.

Within the scope of the invention, it is preferred that, in the general formula (I), $A^1$, $A^2$, $A^3$ and $A^4$ all represent a group of general formula (II) wherein X represents a nitrogen atom, or a carbon atom bearing a hydrogen atom or a group $R^3$ as defined earlier.

In which case, it is more particularly preferred that X represents a nitrogen atom, or a carbon atom bearing a hydrogen atom or a group capable of promoting solubility in water of the ethylenediamine derivative such as for example, a —OH group or a —(CH$_2$CH$_2$)$_n$—OH group wherein n is an integer equal to or greater than 1.

It is also preferred that, in the general formula (II), at least one of $R^1$, $R^2$ and $R^4$ represent a complexing group —COOH.

In which case, it is most particularly preferred that the other ones of $R^1$, $R^2$ and $R^4$ represent a hydrogen atom.

Moreover, it is preferred that, in the general formula (I), $A^1$, $A^2$, $A^3$ and $A^4$ be identical with each other and this for more greatly facilitating the synthesis of the ethylenediamine derivative.

Ethylenediamine derivatives which meet all these preferences are for example:

N,N,N',N'-tetrakis[(6-carboxypyridin-2-yl)methyl]ethylene-diamine, which fits the general formula (Ia) hereafter:

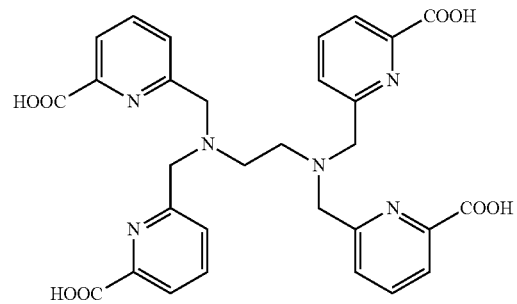

(Ia)

N,N,N',N'-tetrakis[(6-carboxy-4-hydroxypyridin-2-yl)methyl]-ethylenediamine, which fits the general formula (1b) hereafter:

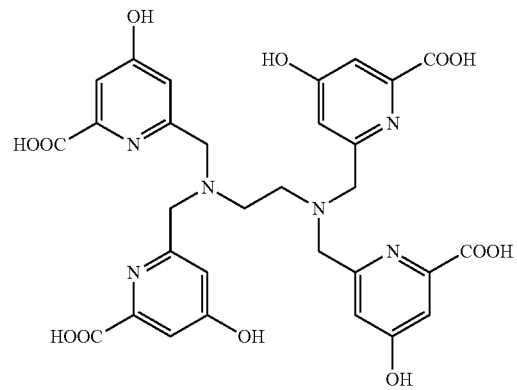

(Ib)

N,N,N',N'-tetrakis[(6-carboxy-4-polyethyleneglycolpyridin-2-yl)-methyl]ethylenediamines, which fit the particular formula (Ic) hereafter:

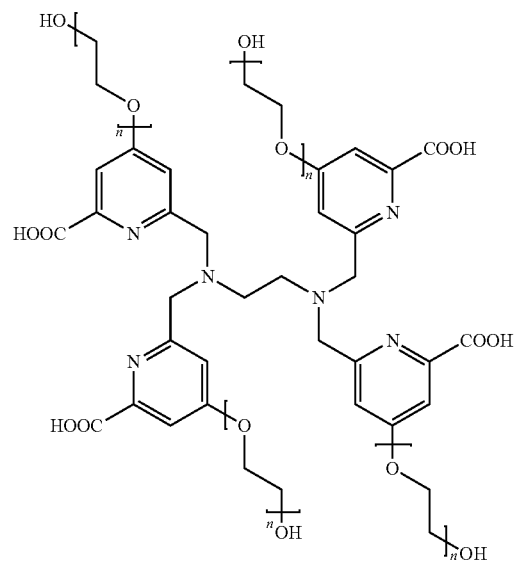

(Ic)

wherein n is comprised between 1 and 12 and preferably is equal to 1, 2, 4, 6, 8, 10 and 12; and N,N,N',N'-tetrakis[(6-carboxypyrazin-2-yl)methyl]ethylenediamine which fits the particular formula (Id) hereafter:

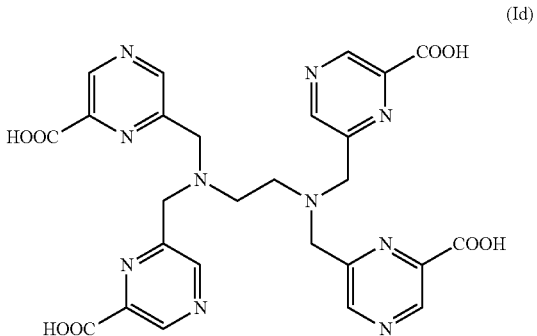 [SMILES: O=C(O)c1cncc(CN(CCN(Cc2cncc(C(=O)O)n2)Cc2cncc(C(=O)O)n2)Cc2cncc(C(=O)O)n2)n1]

(Id)

Among these ethylenediamine derivatives, N,N,N',N'-tetrakis[(6-carboxypyridin-2-yl)methyl]ethylenediamine is most particularly preferred, which will be designated more simply by $H_4$TPAEN in the following.

Indeed, this derivative proved to have, in addition to a particularly interesting affinity for americium, a capability of complexing this element even in aqueous phases with moderate acidity, i.e. in practice a pH of the order of 1 (which corresponds to a nitric acid concentration of the order of 0.1 mol/L in the case of a nitric aqueous phase).

This last feature is very advantageous since it gives the possibility of notably doing without the use of a buffer system intended for stabilizing the pH of the acid aqueous phase, this is not the case with the biphasic systems proposed in the state of the art for separating americium from other metal elements and operating at a pH above 1.5.

Thus, the acid aqueous phase may, if this is desired, only consist of the ethylenediamine derivative of the particular formula (Id), of an acid and water.

As mentioned earlier, the ethylenediamine derivative of general formula (I) may be present in the aqueous phase in its acid form or in the form of a salt like a salt of an alkaline metal such as of the sodium or potassium salt type, or a salt of an earth alkaline metal such as of the magnesium or calcium salt type, or an organic salt such as of the hydroxylamine salt type.

Within the scope of the invention, the acid aqueous phase is preferably a nitric aqueous phase for which the nitric acid concentration preferentially ranges from 0.001 to 3 mol/L and, even better, from 0.01 to 1 mol/L and more preferably from 0.01 to 0.3 mol/L.

Moreover, the ethylenediamine derivative of general formula (I) or its salt is advantageously present in this acid aqueous phase at a concentration ranging from $10^{-3}$ to $10^{-1}$ mol/L, preferably from $10^{-4}$ to $10^{-2}$ mol/L and even better from $10^{-3}$ to $5 \times 10^{-2}$ mol/L.

The extractant(s) present in the organic phase may notably be selected from solvating extractants and cation exchange extractants.

As examples of solvating extractants which may be suitable, mention may be made of:
malonamides such as N,N'-dimethyl-N,N'-dibutyltetradecyl-malonamide (or DMDBTDMA), N,N'-dimethyl-N,N'-dioctylhexylethoxymalonamide (or DMDOHEMA), N,N'-dimethyl-N,N'-dioctyloctylmalonamide (or DMDOOMA), N,N'-dimethyl-N,N'-dioctylhexylmalonamide (or DMDOHxMA), N,N'-dimethyl-N,N'-dioctyl-heptylmalonamide (or DMDOHpMA) or N,N'-dimethyl-N,N'-dibutyldodecylmalonamide (or DMDBDDEMA);

tetradentate N,N,N',N'-tetraalkyl-3,6-dioxaoctanediamide extractants such as N,N,N',N'-tetraoctyl-3,6-dioxaoctanediamide (or DOODA-$C_8$), N,N,N',N'-tetradodecyl-3,6-dioxaoctanediamide (or DOODA-$C_{12}$);

lipophilic diglycolamides (i.e. for which the total number of carbon atoms is greater than 24) such as N,N,N',N'-tetraoctyl-3-oxapentanediamide (or TODGA), N,N,N',N'-tetradecyl-3-oxapentanediamide (or TDDGA) or N,N,N',N'-tetra-2-ethylhexyl-3-oxapentanediamide (or TEHDGA);

alkylphosphine oxides such as trioctylphosphine oxide (or TOPO), tributylphosphine oxide (or TBPO) or the mixture of trialkylphosphines known under the shortcut TRPO;

carbamoylphosphine oxides such as octylphenyl-N,N-diisobutyl-carbamoylmethylphosphine (or CMPO);

carbamoylphosphonates such as dihexyl-N,N-diethylcarbamoyl-methylphosphonate (or DHDECMP);

dialkyl sulfides such as dihexyl sulfide;

substituted pyridines such as bistriazinyl-1,2,4-pyridines (or BTP);

2,2'-dibenzimidazoles; and bisphenylphosphonic acid alkyl esters.

As examples of cation exchange extractants which may be suitable, mention may be made of:
alkylphoshoric acids such as di(2-ethylhexyl)phosphoric acid (or HDEHP), dihexylphosphoric acid (or HDHP), bis-(1,3-dimethylbutyl)phosphoric acid (or HBDMBP) or diisodecylphosphoric acid (or DIDPA);

alkylphosphonates such as p-2-ethylhexyl-o-2-ethylhexylhydrogen-phosphonate (or PC88A), p-propyl-o-heptylhydrogenphosphonate, p-butyl-o-octyl-hydrogen-phosphonate or p-pentyl-o-hexylhydrogenphosphonate;

alkylphosphinic acids such as bis(2,4,4-trimethylpentyl) phosphinic acid (or Cyanex 272);

lipophilic carboxylic acids such as decanoic acid or cyanodecanoic acid;

sulfonic acids such as dinonylnaphthalene sulfonic acid (or HDNNS);

thiophosphoric acids, thiophosphonic acids, thiophosphinic acids such as bis(2,4,4-trimethylpentyl)dithiophosphinic acid (or Cyanex 301), thiophosphorous acids, lipophilic hydroxyoximes and lipophilic β-diketones such as 3-phenyl-4-benzoyl-5-isoxazolone (or HPBI).

As for the organic diluent, it may be selected from all polar or aliphatic organic diluents for which the use was proposed for achieving liquid-liquid extractions in the field of the processing of irradiated nuclear fuels, such as toluene, xylene, t-butyl-benzene, di- or tri-isopropylbenzene, kerosene, dodecanes either linear or branched, such as n-dodecane or hydrogenated tetrapropylene (or TPH), isane, a normal paraffinic hydrocarbon (or NPH), metanitrobenzotrifluoride, 5,5'-oxybis(methyleneoxy)]-bis(1,1,2,2,3,3,4,4-octafluoropentane), alcohols such as 1-octanol, and mixtures thereof.

The organic phase may further comprise one or more phase modifying agents capable of increasing the loading capacity of this phase, i.e. the maximum concentration of metal elements which this phase may have without causing formation of a third phase by demixing.

In which case, these phase modifying agent(s) may notably be selected from alkyl phosphates such as tri-n-butylphosphate (or TBP) or tri-n-hexylphosphate (or THP), alcohols such as 1-octanol, 1-decanol or isodecanol, monoamides such as N,N-dihexyloctanamide (or DHOA), N,N-dibutyldecanamide (or DBDA), N,N-di(ethylhexyl)acetamide (or D2EHAA), N,N-di(2-ethylhexyl)propionamide (or D2EHPRA), N,N-di(2-ethylhexyl)isobutyramide (or D2EHiBA) or N,N-dihexyldecanamide (or DHDA), and malonamides such as DMDBTDMA, DMDOHEMA, DMDOOMA, DMDOHxMA, DMDOHpMA or DMDBDDEMA.

The organic phase may therefore be of the same type as the ones used in the process of the state of the art which aim at recovering actinides(III), by liquid-liquid extraction, from acid aqueous solutions, either selectively or together with lanthanides and in particular, those which use:

- a diglycolamide extractant (references [3] to [7]);
- a diamide tetradentate extractant N,N,N',N'-tetraalkyl-3,6-dioxaoctanediamide (reference [8]);
- a malonamide extractant (references [9] and [10]);
- a mixture of a malonamide extractant and of an alkylphosphoric acid extractant (DIAMEX-SANEX process, references [11] and [12]);
- a mixture of an alkylphosphoric extractant and of a carbamoyl-phosphine oxide extractant (reference [13]);
- an alkylphosphoric acid extractant (TALSPEAK process and its alternatives, references [14] to [16]; DIDPA process, references [17] and [18]);
- a bisphenylphosphinic acid alkyl ester extractant (reference [19]);
- an alkylphosphonate extractant (reference [20]);
- a β-diketone extractant (references [21] and [22]);
- a carbamoylphosphine extractant (SEFTICS process, references [23] and [24]; TRUEX process, references [25] and [26]);
- an alkylphosphine oxide extractant (references [27] to [29]);
- a substituted pyridine extractant (references [30] and [31]); or
- a thiophosphonic acid extractant (references [32] to [35]).

The result of this is—and this is one of the many advantages of the americium separation process according to the invention—that this process may be applied to process which have been proposed in the state of the art for recovering actinides(III), by liquid-liquid extraction, from acid aqueous solutions, either being integrated into these process as a step or used as a supplementary step, i.e. downstream, from these process.

It thus becomes possible to use these process of the state of the art for selectively recovering americium from acid aqueous solutions.

Therefore, the object of the invention is also a process for selective recovery of americium present in an acid aqueous phase containing, further to americium, other metal elements, characterized in that it comprises the implementation of a process for separating americium as defined earlier.

Within the scope of the invention, this acid aqueous phase preferably contains, as other metal elements, at least curium and fission products including lanthanides, but is free of uranium, plutonium and neptunium or only contains these last three elements in trace amounts. Such an aqueous phase may notably be a raffinate stemming from the first purification cycle of a PUREX or COEX™ process.

In a first preferred embodiment of this process for selective recovery of americium, the latter comprises at least the following steps:

a) extraction of the americium and of all or part of the other metal elements present in the acid aqueous phase, which extraction comprises at least one operation in which this aqueous phase is put into contact with an organic phase which is non-miscible with it, containing at least one extractant in an organic diluent, and then separated from this organic phase; and b) selective stripping of the americium present in the organic phase from step a), which stripping comprises at least one operation in which this organic phase is put into contact with an acid aqueous phase, containing an ethylenediamine derivative of general formula (I) or a salt thereof, and then separated from this aqueous phase.

Thus, in this first embodiment, the process for separating americium according to the invention is used for selectively stripping americium from an organic phase in which this americium has been extracted beforehand together with all or part of the other metal elements. Therefore it is this organic phase which corresponds to the phase P1 while the acid aqueous phase used for achieving the selective stripping of americium corresponds to the phase P2.

As known per se, the acid aqueous phase subject to step a) may contain one or more complexing agents, capable of avoiding or at the very least limiting the extraction of certain metal elements, the presence of which in the organic phase stemming from step a) would be able to interfere with the selective stripping of americium in step b).

In which case, this (these) complexing agent(s) may notably be selected from:

- hydrophilic diglycolamides (i.e. for which the total number of carbon atoms does not exceed 24) such as N,N,N',N'-tetramethyldiglycolamide (or TMDGA), N,N,N',N'-tetraethyldiglycolamide (or TEDGA), N,N,N',N'-tetrapropyl-diglycolamide (or TPDGA) or N,N,N',N'-tetra(2-ethylhexyl)diglycolamide (or TEHDGA);
- carboxylic acids such as oxalic acid, malonic acid or mesoxalic acid (also known as ketomalonic acid);
- polyaminocarboxylic acids such as N-(2-hydroxyethyl) ethylene diamine triacetic acid (or HEDTA), nitrilotriacetic acid (or NTA) or diethylene triamine pentaacetic acid (or DTPA);
- pyridine polycarboxylic acids such as dipicolinic acid (or DPA, also known as 2,6-pyridine dicarboxylic acid);
- hydroxycarboxylic acids such as glycolic acid, citric acid or tartaric acid;
- amines, polyazines grafted with alkyl chains comprising from 1 to 8 carbon atoms, hydrophilic hydroxyoximes, sulfonic acids, hydroaxamic acids and hydrophilic β-diketones;

and this, depending on the extractant(s) which is (are) present in the organic phase, on the one hand, and on the metal element for which it is intended to avoid or limit the extraction, on the other hand.

According to a first preferred arrangement of this first embodiment:

- step a) further comprises, after the separation of the organic and aqueous phases, at least one operation of washing the organic phase with an acid aqueous phase possibly containing the same complexing agent(s) as the one or those present in the acid aqueous phase subject to step a); and/or
- step b) further comprises, after the separation of the organic and aqueous phases, at least one operation of washing the aqueous phase with an organic phase having the same composition as the one used in step a).

According to another preferred arrangement of this first embodiment, the process for selectively recovering americium further comprises a step c) of stripping metal elements present in the organic phase stemming from step b), which stripping comprises at least one operation in which this organic phase is put into contact with an acid aqueous phase and then separated from this aqueous phase.

There again, the acid aqueous phase used for this stripping may contain one or more complexing agent(s) capable of facilitating the migration of certain metal elements into the aqueous phase. In which case, this (these) complexing agent(s) may notably be selected from the complexing agents mentioned earlier.

According to yet another preferred arrangement of this first embodiment, the organic phase used in step a) contains a mixture of a malonamide extractant and of an alkylphosphoric acid extractant such as a mixture of DMDOHEMA and HDEHP, or else a diglycolamide extractant such as TODGA.

In a second preferred embodiment of the process for selectively recovering americium according to the invention, this process comprises at least one step a) of selective extraction of all the metal elements other than americium present in the acid aqueous phase, which extraction comprises at least one operation in which this aqueous phase is put into contact with an organic phase which is non-miscible with it, containing at least one extractant in an organic diluent, and then separated from this organic phase, and is carried out after or simultaneously with the addition of at least one ethylenediamine derivative of general formula (I) or a salt of the latter to the acid aqueous phase.

Thus, in this second embodiment, the process for separating americium according to the invention is used for selectively extracting all the metal elements other than americium from the acid aqueous phase in which the americium and the other metal elements are present initially. It is therefore this acid aqueous phase which corresponds to the phase P1 while the organic phase used for achieving selective extraction of all the metal elements other than americium corresponds to phase P2.

According to a first preferred arrangement of this second embodiment, step a) further comprises, after separation of the organic and aqueous phases, at least one operation of washing the organic phase by putting this organic phase into contact with an acid aqueous phase containing the same ethylenediamine derivative of general formula (I) as the one used in the previous operation.

According to a preferred arrangement of this second embodiment, the process further comprises a step b) of stripping metal elements present in the organic phase stemming from step a), which stripping comprises at least one operation in which this organic phase is put into contact with an acid aqueous phase, and then separated from this aqueous phase.

There again, the acid aqueous phase used for this stripping may contain one or more complexing agents, capable of facilitating the migration of certain metal elements into the aqueous phase, in which case this (these) complexing agent(s) may notably be selected from the complexing agents mentioned earlier.

According to yet a further preferred arrangement for this second embodiment, the organic phase contains an alkylphosphoric acid extractant such as, for example, HDEHP mixed with a phase modifier such as TBP or DMDOHEMA, or a diglycolamide extractant such as TODGA.

Regardless of how the selective recovery process for americium is implemented, the ethylene-diamine derivative of general formula (I) is preferably $H_4TPAEN$ which is used at a concentration preferentially ranging from $10^{-4}$ to $10^{-2}$ mol/L and, even better, from $10^{-3}$ to $5 \times 10^{-2}$ mol/L.

The process for selective recovery of americium according to the invention has many advantages. In particular:
  it allows recovery of more than 99% of the americium initially present in an acid aqueous phase with less than 1% of the other metal elements initially present in this phase, as shown in the following examples;
  it does not set into play any oxidation-reduction reaction of americium or of any other metal element and therefore does not comprise any of the drawbacks related to such a reaction;
  as an organic phase, it may use any of the organic phases, the use of which has been proposed in process from the state of the art which aim at recovering actinides(III), by liquid-liquid extraction, from acid aqueous solutions, either selectively or together with lanthanides and may therefore be easily used instead of these process or as an addition to the latter; and
  it may be applied to the treatment of aqueous phases having a high nitric acid concentration, i.e. typically comprised between 0.1 and 3 mol/L of nitric acid, without it being necessary to reduce the acidity of these phases.

Other features and advantages of the invention will become apparent from the additional description which follows and which relates to exemplary embodiments of the process for selective recovery of americium according to the invention, as well as to experimental tests having allowed validation of these examples.

It is obvious that these examples are only given as illustrations of the object of the invention and should by no means be interpreted as a limitation of this object.

SHORT DESCRIPTION OF THE DRAWINGS

Figure 1:
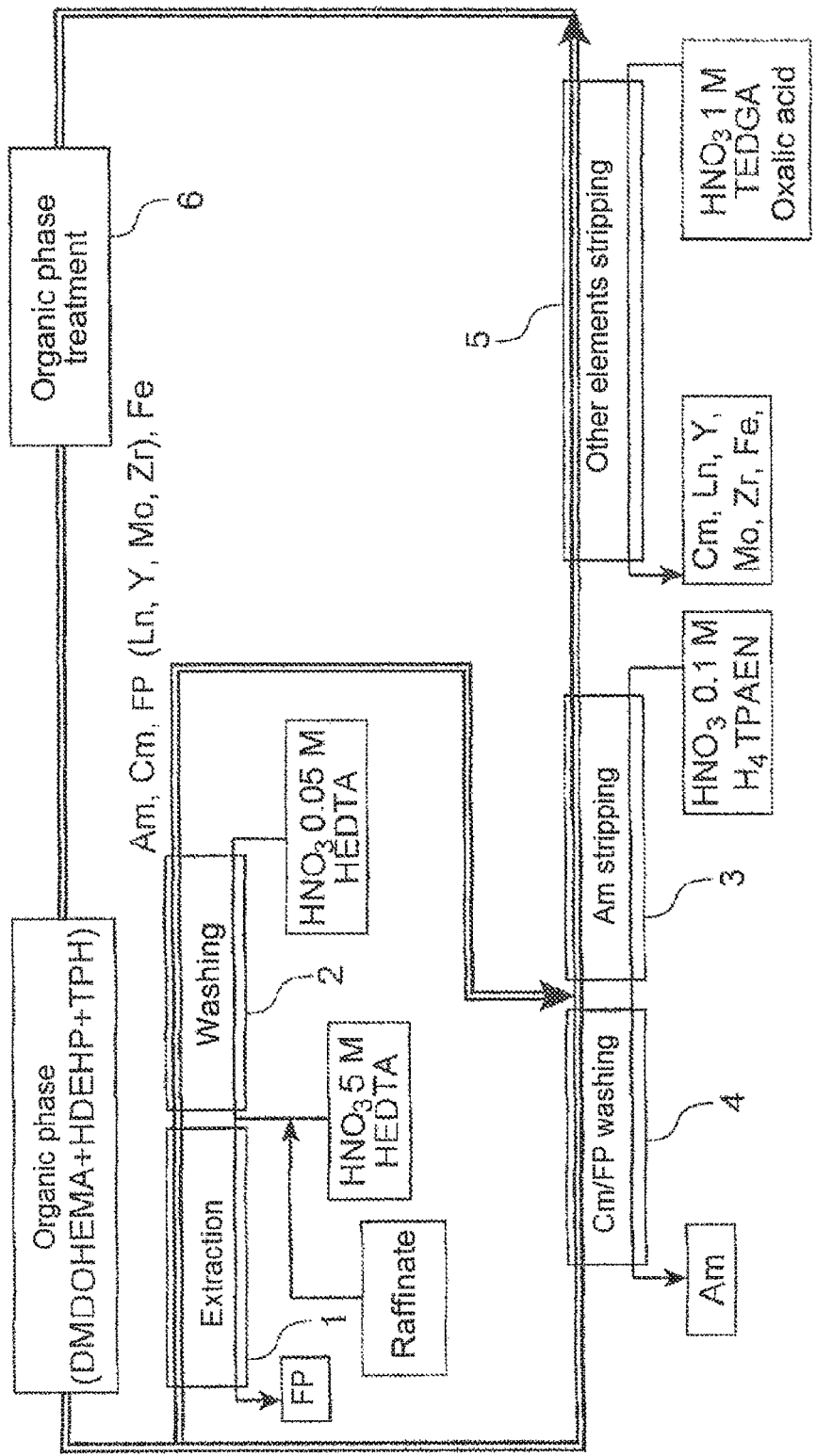
FIG. 1 is a block diagram of a first exemplary embodiment of the process for selective recovery of americium according to the invention, corresponding to an application of the process for separating americium according to the invention to the DIAMEX-SANEX process.
Figure 2:
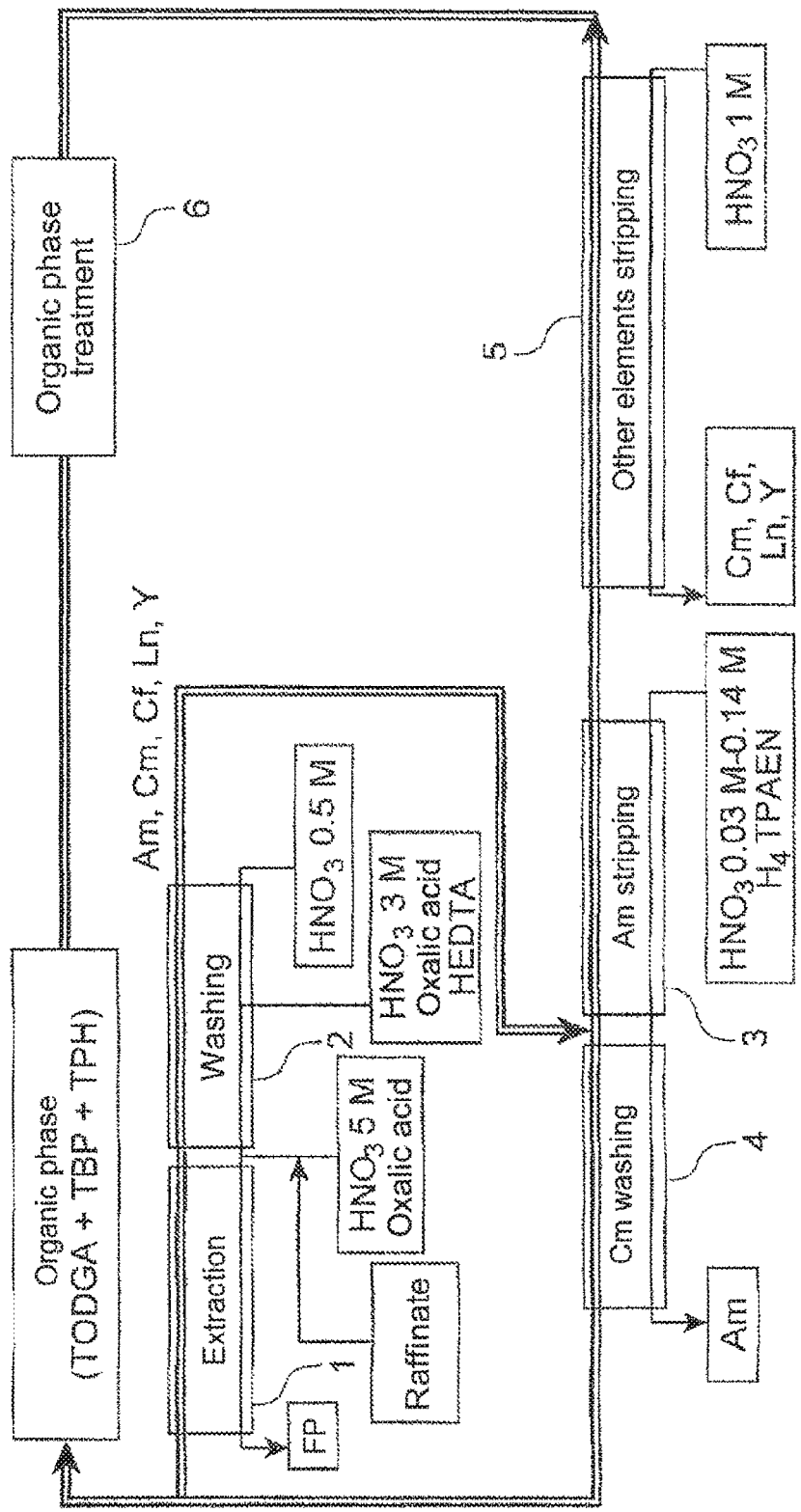
FIG. 2 is a block diagram of a second exemplary embodiment of the process for selective recovery of americium according to the invention, corresponding to an application of the process for separating americium according to the invention to the TODGA process.

In FIGS. 1 and 2, the rectangles referenced as 1 to 6 represent multistage extractors such as those conventionally used in the processing of irradiated nuclear fuels (mixers-decanters, pulsed columns, centrifugal extractors).

The organic phases flowing in and out of these extractors are symbolized by double lines, while the aqueous phases flowing in and out of these extractors are symbolized by solid lines.

DETAILED DISCUSSION OF PARTICULAR EMBODIMENTS

Example 1

Application of the Process for Separating Americium According to the Invention to the DIAMEX-SANEX Process Reference is first made to FIG. 1 which schematically illustrates a first exemplary embodiment of the process for selective recovery of americium according to the invention, corresponding to an application of the process for separating americium according to the invention to the DIAMEX-SANEX process.

It is recalled that the DIAMEX-SANEX process was initially proposed for separating actinides(III) from lanthanides present in a raffinate stemming from the first purification cycle of a PUREX process and is based on the use of two extractants operating in disconnected chemical domains, one of which is a malonamide while the other one is an alkylphosphoric acid.

It is also recalled that a raffinate stemming from the first purification cycle of a PUREX process is an aqueous solution with strong nitric acidity, typically from 2 to 5 M, which contains americium, curium, lanthanides (La, Ce, Pr, Nd, Sm, Eu, Gd, . . . ), fission products other than lanthanides (Mo, Zr, Ru, Rd, Pa, Y, . . . ) as well as corrosion products such as iron. On the other hand, this solution is free of uranium, plutonium and neptunium or, if any of these elements is present, it is only present as trace amounts, i.e. with a mass content not exceeding 0.3%.

As visible in FIG. 1, the process for selective recovery of americium according to the invention comprises a first step designated as "Extraction" in this figure and wherein the raffinate is first of all circulated in a first extractor (referenced as 1 in FIG. 1), as a counter-current against an organic phase which contains a malonamide and an alkylphosphoric acid in solution in an organic diluent.

Like in the DIAMEX-SANEX process, the malonamide is preferably DMDOHEMA which is used at a concentration typically from 0.5 to 0.7 mol/L, for example 0.6 mol/L, while the alkylphosphoric acid is preferentially HDEHP which is used at a concentration typically from 0.1 to 0.5 mol/L, for example 0.3 mol/L.

The organic diluent, as for it, is TPH.

Before or after its introduction into the extractor 1, the nitric acid content of the raffinate is rectified if necessary, for example by adding nitric acid at 5 mol/L, so that it is preferably located between 3 and 5 mol/L, for example 4 mol/L.

Moreover, the raffinate is added with at least one complexing agent, for example a polyaminocarboxylic acid such as HEDTA, at a concentration typically from 0.01 to 0.1 mol/L, for example 0.05 mol/L and the function of which is to inhibit the extraction of palladium by the organic phase.

In a second step called "Washing" in FIG. 1, the organic phase flowing out of the extractor 1 is circulated in a second extractor (referenced as 2 in FIG. 1), as a counter-current against an aqueous phase which preferentially contains from 0.01 to 0.5 mol/L of nitric acid, for example 0.05 mol/L, as well as the same complexing agent(s)—and in the same ranges of concentrations—as the one or those having been added to the raffinate.

Thus, an organic phase is obtained at the end of these first two steps, which contains americium, curium, lanthanides, yttrium, molybdenum, zirconium and iron, and which is directed towards a third extractor (referenced as 3 in FIG. 1) where the third step of the process takes place, i.e. the selective stripping of americium from this organic phase.

This stripping which is designated as "Am Stripping" in FIG. 1, is achieved by applying the process for separating americium according to the invention, i.e. by circulating the organic phase flowing out of the extractor 2 (which in this case corresponds to the phase P1) as a counter-current against an aqueous phase (which therefore corresponds to the phase P2) preferentially containing from $10^{-2}$ to 0.3 mol/L of nitric acid, for example 0.1 mol/L, and an ethylenediamine derivative of general formula (I) such as H$_4$TPAEN, which is used at a concentration preferably ranging from $10^{-4}$ to $10^{-2}$ mol/L, for example $10^{-3}$ mol/L.

As visible in FIG. 1, this stripping is advantageously completed by a fourth step called "Cm/FP Washing" in this figure and which consists in circulating the aqueous phase flowing out of the extractor 3 into a fourth extractor (extractor 4 in FIG. 1), as a counter-current against a "fresh" organic phase, identical in its composition to the one used in the first step, and this so as to recover in the organic phase the possible trace amounts of curium and of fission products which may have followed americium into the aqueous phase during its stripping and thus to enhance the selectivity of this stripping.

Thus, at the end of the third and fourth steps, an aqueous phase is obtained which exclusively or quasi-exclusively contains americium and which therefore leaves the cycle, and an organic phase which no longer or almost no longer contains any americium but which still contains curium, lanthanides, yttrium, molybdenum, zirconium and iron having been extracted during the first step.

This organic phase is then directed towards a fifth extractor (extractor 5 in FIG. 1) where the fifth step of the process takes place, i.e. the stripping of all the metal elements still present in this phase.

This stripping, which is designated as "Other elements Stripping" in FIG. 1, is achieved by circulating the organic phase flowing out of the extractor 3 as a counter-current against an aqueous phase which preferentially contains from 0.5 to 1.5 mol/L of nitric acid, for example 1 mol/L, as well as one or more complexing agents such as water-soluble diglycolamide like TEDGA, which is used at a concentration typically from 0.01 to 0.5 mol/L, for example 0.2 mol/L, together with a carboxylic acid such as oxalic acid, which itself is used at a concentration typically from 0.05 to 0.8 mol/L, for example 0.5 mol/L.

Thus, at the end of this fifth step, an organic phase is obtained which no longer contains any of the metal elements having been extracted during the first step but which contains, in addition to the malonamide extractant and the alkylphosphoric extractant, a certain number of impurities and degradation products, notably from radiolyses, which have accumulated during the previous steps.

As visible in FIG. 1, this organic phase is therefore directed towards a sixth extractor (extractor 6 in FIG. 1) in order to be purified, for example by one or more washings with an aqueous solution of a strong base, with a pH equal to or greater than 8, like a solution of sodium carbonate or sodium hydroxide of 0.1 to 0.3 M and accessorily by one or more filtrations in the case that it contains a precipitate.

The thereby purified organic phase may then be sent back towards the extractors 1 and 4 for applying a new processing cycle.

Example 2

Application of the Process for Separating Americium According to the Invention to a TODGA Process Reference is now made to FIG. 2 which schematically illustrates a second exemplary embodiment of the process for selective recovery of americium according to the invention, corresponding to an application of the process for separating americium according to the invention to the TODGA process.

The TODGA process was initially proposed for recovering together actinides(III) with lanthanides present in a raffinate from the first purification cycle of a PUREX process.

This process is based on the use of a diglycolamide extractant, in this case TODGA, which is a more powerful extractant, at a strong nitric acidity, than DMDOHEMA.

Also, in this exemplary embodiment, the process for selective recovery of americium according to the invention comprises a first step designated as "Extraction" in FIG. 2 and in which the raffinate is circulated in a first extractor (referenced as 1 in FIG. 2) as a counter-current against an organic phase which contains TODGA, at a concentration typically from 0.1 to 0.2 mol/L, in solution in an organic diluent, for example TPH.

A dialkylmonoamide at least as lipophilic as the solvating extractant, such as DHOA or else a alkylphosphate such as TBP, may also be present in the organic phase, for example at a concentration of 0.5 mol/L, in order to increase the load capacity of this phase.

Like in Example 1, the nitric acid content of the raffinate is, if necessary, rectified, either before or during its introduction into the extractor 1, for example by adding 5 mol/L nitric acid, so that it is preferably located between 3 and 5 mol/L, for example 4 mol/L.

This raffinate is moreover added with at least two complexing agents, one of which has the function of inhibiting the extraction of palladium while the other one has the function of inhibiting the extraction of zirconium and iron. The first of these complexing agents is therefore, for example, HEDTA like in Example 1, while the second one is, for example, a carboxylic acid such as oxalic acid, which is used at a concentration typically of 0.5 mol/L.

In a second step designated as "Washing" in FIG. 2, the organic phase flowing out of the extractor 1 is circulated in a second extractor (referenced as 2 in FIG. 2), as a counter-current against a first aqueous phase which preferentially contains from 1 to 4 mol/L of nitric acid, for example 3 mol/L, as well as the same complexing agents—and in the same ranges of concentrations—as those having been added to the raffinate, and then as a counter-current against a second aqueous phase more weakly acid than the previous one, for example with 0.5 mol/L of nitric acid.

Thus, at the end of both of these first steps, an organic phase is obtained which contains americium, curium, californium, lanthanides and yttrium, and which is directed towards a third extractor (referenced as 3 in FIG. 2) where the third step of the process takes place, i.e. the selective stripping of americium from this organic phase.

This stripping, which is designated as "Am Stripping" in FIG. 2, is achieved by applying the process of separating americium according to the invention, i.e. by circulating the organic phase flowing out of the extractor 2 (which corresponds in this case to the phase P1) as a counter-current against an aqueous phase (which therefore corresponds to the phase P2) which preferentially contains from 0.03 to 0.14 mol/L of nitric acid, for example 0.1 mol/L, an ethylenediamine derivative of general formula (I) such as $H_4$TPAEN, which is used at a concentration preferably ranging from $10^{-4}$ to $10^{-2}$ mol/L, for example $10^{-3}$ mol/L, and accessorily a desalting salt such as sodium, lithium or hydroxylamine nitrate, which is used at a concentration typically from 0.1 to 3 mol/L, for example 1 mol/L.

As visible in FIG. 2, this stripping is advantageously completed by a fourth step called "Cm Washing" in this figure and which consists in circulating in a fourth extractor (extractor 4 in FIG. 2) the aqueous phase flowing out of the extractor 3 through a "fresh" organic phase, identical in its composition with the one used in the first step, and this so as to recover in the organic phase the possible trace amounts of curium, californium, of fission products and corrosion products which may have followed the americium into the aqueous phase during its stripping and, thus enhancing the selectivity of this stripping.

Thus, at the end of the third and fourth steps, an aqueous phase is obtained which exclusively or quasi-exclusively contains americium and which therefore leaves the cycle, and an organic phase which no longer or quasi-no longer contains any americium but which still contains curium, californium, lanthanides and yttrium having been extracted during the first step.

This organic phase is directed towards a fifth extractor (extractor 5 in FIG. 2) where the fifth step of the process takes place, i.e. stripping of all the metal elements still present in this phase.

This stripping, which is designated as "Other elements Stripping" in FIG. 2, is achieved by circulating the organic phase flowing out of the extractor 3 as a counter-current against an aqueous phase which preferentially contains from 0.005 to 0.05 mol/L of nitric acid, for example 0.01 mol/L, and which is advantageously free of any complexing agent.

Like in Example 1, the organic phase flowing out of the extractor 5 is directed towards a sixth extractor (extractor 6 in FIG. 2) so as to be purified before being sent back to the extractors 1 and 4 for applying a new processing cycle.

Example 3

Experimental Validation of the Process Described in Examples 1 and 2

Experimental tests intended to verify the validity of the process described in Examples 1 and 2 are conducted by using $H_4$TPAEN as the ethylenediamine derivative of general formula (I).

For the needs of these tests, $H_4$TPAEN was synthesized by using pyridine-2,6-dicarboxylic acid as starting product, by following a procedure substantially different from the one proposed in reference [2].

Figure 3:
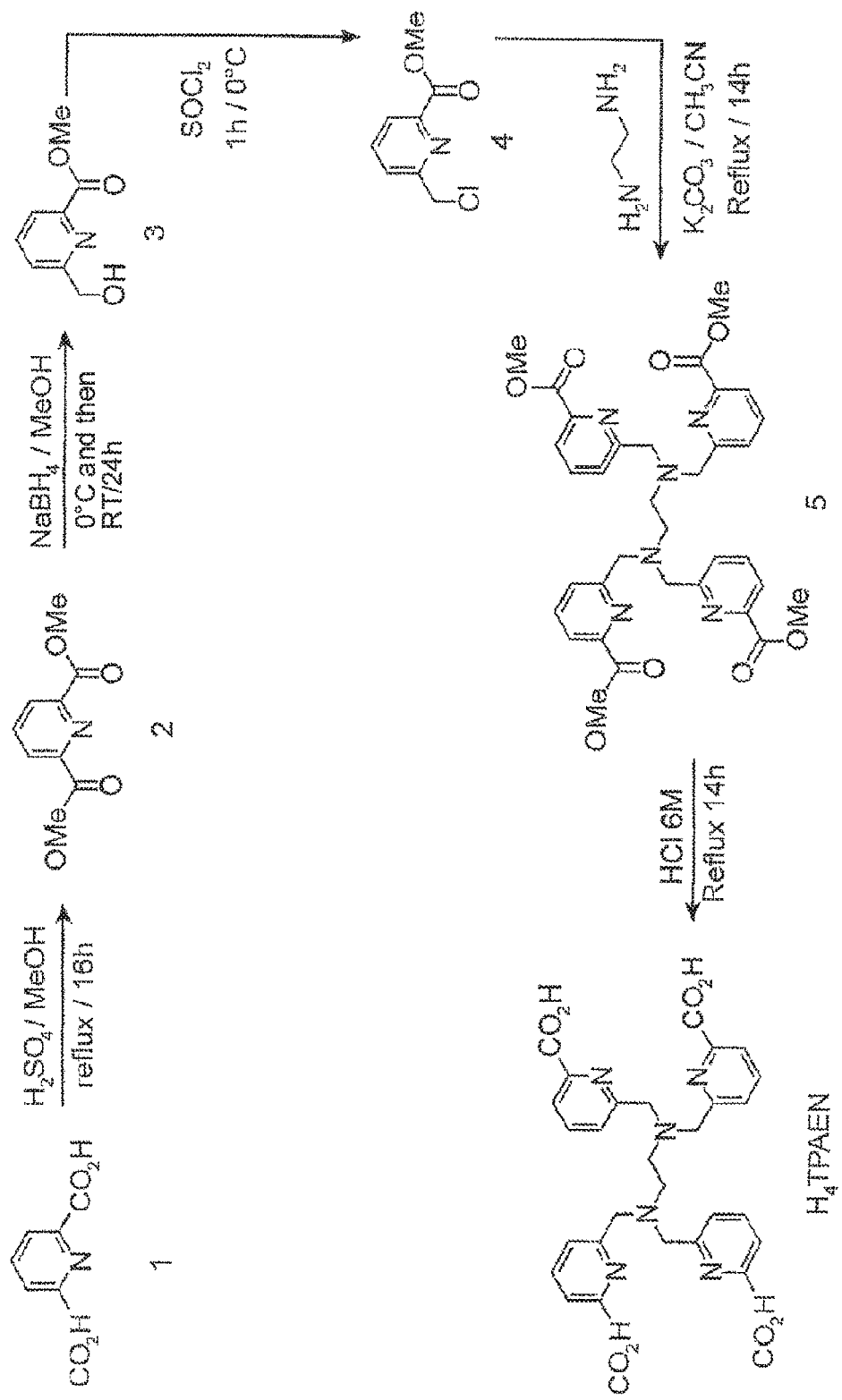
FIG. 3 illustrates the scheme for synthesis of $H_4TPAEN$ from pyridine-2,6-dicarboxylic acid.

This synthesis is therefore described hereafter and schematized in FIG. 3.

1) Synthesis of $H_4$TPAEN

Synthesis of dimethyl 2,6-pyridine carboxylate from pyridine-2,6-dicarboxylic acid 5.2 g ($3.1 \times 10^{-2}$ mol) of pyridine-2,6-dicarboxylic acid, noted as 1 in FIG. 3, are suspended in 20 mL of anhydrous methanol. A volume of 900 µL of 97% sulfuric acid is added and the mixture is refluxed for 16 hours. After cooling, the methanol is evaporated in vacuo so as to obtain a white solid. Saturated sodium dicarbonate is added up to a pH=7, i.e. about 200 mL. An equal volume of dichloromethane is then used for carrying out a first extraction. The aqueous phase is re-extracted with 100 mL of dichloromethane. The organic phases are collected and washed with 50 mL of saturated sodium chloride. The final organic phase is dried on anhydrous sodium sulfate. The solvent is evaporated in vacuo.

Thus, 5.3 g of dimethyl 2,6-pyridine carboxylate, noted as 2 in FIG. 3, are obtained as a white solid, with a yield of 90%.

The proton NMR analysis of this compound is the following:

$^1$H NMR (CDCl$_3$, 300 MHz, 298K), δ (ppm): 8.25 (d, J=7.3 Hz, 2H); 7.97 (t, J=7.3 Hz, 1H); 3.96 (s, 6H, CH$_3$)

Synthesis of methyl 6-hydroxymethyl-2-pyridine carboxylate from dimethyl 2,6-pyridine carboxylate 2 g ($10^{-2}$ mol) of dimethyl 2,6-pyridine carboxylate are suspended in 90 mL of methanol. The medium is cooled to 0° C. and then 590 mg ($1.56 \times 10^{-2}$ mol) of sodium borohydride are added in three times at this temperature. The solution becomes limpid and the medium is stirred at room temperature for 24 hours. The pH is brought to 3 with 37% hydrochloric acid. The solvent is evaporated and the solid is then resuspended with 100 mL of water and saturated sodium bicarbonate in order to obtain a pH of 7. The extraction of the product in the organic phase is achieved with 100 mL of dichloromethane. The aqueous phase is re-extracted with the same amount of solvent. The organic phases are grouped and dried on anhydrous sodium sulfate.

1.41 g of methyl 6-hydroxymethyl-2-pyridine carboxylate is thereby obtained, noted as 3 in FIG. 3, as a white solid, i.e. a yield of 82%.

The proton and carbon 13 NMR analysis of this compound are the following:

$^1$H NMR (CDCl$_3$, 300 MHz, 298K), δ (ppm): 8.04 (dt, J=7.7 Hz, J=0.6 Hz, 1H); 7.86 (t, J=7.7 Hz, 1H); 7.57 (dt, J=7.7 Hz, J=0.6 Hz, 1H); 4.88 (s, 2H, CH$_2$OH); 3.99 (s, 6H, CH$_3$)

$^{13}$C NMR, DEPT 135, (CDCl$_3$, 300 MHz, 298K), δ (ppm): 138.1; 124.5; 124.2; 65.1 (CH$_2$OH); 53.3 (CH$_3$)

Synthesis of methyl 6-chloromethyl-2-pyridine carboxylate from methyl 6-hydroxymethyl-2-pyridine carboxylate 2.25 g (1.28×10$^{-2}$ mol) of methyl 6-hydroxymethyl-2-pyridine carboxylate are reacted at 0° C. with 4.5 mL (6.1×10$^{-2}$ mol; 4.5 equiv.) of thionyl chloride used both as a reagent and a solvent. The reaction occurs at 0° C. for 1 hour. The excess of thionyl chloride is evaporated in vacuo at room temperature and methanol is added until there is no gas evolvement. After 5 minutes, the solution is evaporated in vacuo. The yellow oil is taken up with 100 mL of toluene and washed twice with 50 mL of cold 10% sodium bicarbonate. The aqueous phases are re-extracted with 100 mL of toluene. The organic phases are grouped, washed and dried with saturated sodium chloride.

Thus, 2.32 g of methyl 6-chloromethyl-2-pyridine carboxylate, noted as 4 in FIG. 3, are obtained as a yellow oil which crystallizes, i.e. a yield of 90%.

The proton and carbon 13 NMR analysis of this compound are the following:

$^1$H NMR (CDCl$_3$, 300 MHz, 298K), δ (ppm): 8.10 (d, J=7.71 Hz, 1H); 7.92 (t, J=7.71 Hz, 1H); 7.75 (d, J=7.71 Hz, 1H); 4.79 (s, 2H, CH$_2$Cl); 4.03 (s, 6H, CH$_3$)

$^{13}$C NMR, DEPT 135, (CDCl$_3$, 300 MHz, 298K), δ (ppm): 138.6; 126.6; 124.9; 53.5 (CH$_3$); 40.7 (CH$_2$Cl)

Synthesis of N,N,N',N'-tetrakis[(6-carboxymethyl-pyridin-2-yl)methyl]ethylenediamine from methyl 6-chloromethyl-2-pyridine carboxylate 2 g (1.08×10$^{-2}$ mol) of methyl 6-chloromethyl-2-pyridine carboxylate are introduced into the reactor and the circuit is purged by sweeping with an argon stream. A volume of 36 mL of anhydrous acetonitrile is added and then, after dissolution of the product, 175 µL (2.63×10$^{-3}$ mol) of ethylenediamine and then 1.49 g (1.08×10$^{-2}$ mol) of potassium carbonate are added. The mixture is refluxed for 14 hours and the solution becomes orange. The solvent is evaporated for obtaining an oil which crystallizes. The latter is taken up with 100 mL of dichloromethane. The organic phase is washed twice with 40 mL of water and then dried on anhydrous sodium sulfate, which gives the possibility of obtaining 2.48 g of an orange solid which is recrystallized from isopropanol.

700 mg of purified N,N,N',N'-tetrakis[(6-carboxymethylpyridin-2-yl)-methyl]ethylenediamine, noted as 5 in FIG. 3, are thus recovered as a beige solid, i.e. a yield of 40%.

Proton NMR analysis of this compound is the following:
$^1$H NMR (CDCl$_3$, 300 MHz, 298K), δ (ppm): 7.97 (dd, J=6.96 Hz, J=1.68 Hz, 1H); 7.71 (massive, 2H); 3.98 (s, 12H, CH$_3$); 3.89 (s, 8H, PyCH$_2$N); 2.78 (s, 4H, NCH$_2$CH$_2$)

Synthesis of H$_4$TPAEN from N,N,N',N'-tetrakis[(6-carboxymethylpyridin-2-yl)-methyl]ethylenediamine 825 mg of N,N,N',N'-tetrakis[(6-carboxymethylpyridin-2-yl)methyl]-ethylenediamine are suspended in 4.5 mL of 6 M hydrochloric acid. The mixture is refluxed for 14 hours and a brown precipitate appears at room temperature. This solid is filtered, washed twice with 2 mL of water and then dried in vacuo at room temperature for 14 hours.

690 mg of H$_4$TPAEN are thus obtained as a beige powder, i.e. a yield of 80%.

The proton NMR analysis of this compound is the following.

$^1$H NMR (DMSO$_{d6}$, 300 MHz, 298K), δ (ppm): 7.91 (massive, 2H); 7.67 (massive, 1H); 4.51 (s, 8H, PyCH$_2$N); 3.70 (s, 4H, NCH$_2$CH$_2$)

2) Experimental Validation of the Process Described in Example 1

Extraction/Washing:
Tests in tubes are conducted by using:
- an aqueous phase simulating a raffinate stemming from the processing of an irradiated nuclear fuel of the UOX3 type by a PUREX process except as regards to americium 241 and curium 244 which are only present as trace amounts;
- an organic phase containing 0.6 mol/L of DMDOHEMA and 0.3 mol/L of HDEHP in TPH; and
- for the washing, distilled water, voluntarily free of any complexing agent so as not to inhibit the extraction of palladium and to be able to study its behavior during the subsequent step of selective stripping of americium.

The nitric acidity of the aqueous phase simulating the raffinate is 4 mol/L.

Its qualitative and quantitative composition in metal elements is given in Table I hereafter. All these elements are dissolved as nitrates.

TABLE I

| Elements | Concentrations | |
|---|---|---|
| | mmol/L | mg/L |
| $^{241}$Am | 5.9 × 10$^{-4}$ | 1.4 × 10$^{-1}$ |
| $^{244}$Cm | 8.2 × 10$^{-6}$ | 2 × 10$^{-3}$ |
| Ce | 5.5 | 760 |
| Eu | 0.32 | 48 |
| Fe | 1.8 | 100 |
| Gd | 0.23 | 36 |
| La | 2.8 | 391 |
| Mo | 12 | 1137 |
| Nd | 9.0 | 1297 |
| Pd | 4.2 | 448 |
| Pr | 2.6 | 363 |
| Sm | 1.9 | 282 |
| Y | 0.61 | 54 |
| Zr | 13 | 1189 |

The organic phase and the aqueous phase simulating the raffinate are first of all put into contact with each other, volume to volume, and left with stirring for 10 minutes at a constant temperature of 25° C.

After decantation and separation of the organic phase from the aqueous phase, the activities of americium 241 and curium 244 are measured by α spectrometry in each of these phases while the concentrations of the other metal elements are measured by inductively coupled plasma atomic emission spectrometry, also known under the shortcut ICP-AES in the aqueous phase alone.

The distribution coefficients of americium 241 and of curium 244 are determined by calculating the (activity in the organic phase)/(activity in the aqueous phase) ratio while the distribution coefficients of the other metal elements are determined by calculating the ((initial concentration—final concentration)/initial concentration) ratio.

Next, the organic phase is put into contact with distilled water, in an amount of 8 volumes of distilled water for 1 volume of organic phase, and the whole is left with stirring for 10 minutes at a constant temperature of 25° C.

After decantation and separation of the organic and aqueous phases, the activities of americium 241 and of curium 244 are measured by α spectrometry in each of these phases while the concentrations of the other metal elements are measured by ICP-AES in the aqueous phase alone.

The distribution coefficients of americium 241, curium 244 and of the other metal elements are determined in the same way as previously.

Table II hereafter shows the distribution coefficients ($D_M$) and the thereby obtained separation factors ($FS_{Am/M}$). The distribution coefficients of nitric acid are also indicated in this table.

TABLE II

| Elements | | Extraction | | Washing | |
|---|---|---|---|---|---|
| | | $D_M$ | $FS_{Am/M}$ | $D_M$ | $FS_{Am/M}$ |
| Elements | $^{241}$Am | 8.1 | | 22 | |
| | $^{244}$Cm | 5.1 | 1.6 | 20 | 1.1 |
| | Ce | 7.9 | 1.0 | 19 | 1.1 |
| | Eu | 5.9 | 1.4 | 132 | 0.17 |
| | Fe | 82 | 0.10 | >200 | <0.11 |
| | Gd | 4.3 | 1.9 | 43 | 0.5 |
| | La | 6.0 | 1.4 | 8 | 2.7 |
| | Mo | 136 | 0.06 | 387 | 0.1 |
| | Nd | 7.0 | 1.2 | 25 | 0.9 |
| | Pd | 5.4 | 1.5 | 2 | 11.7 |
| | Pr | 8.1 | 1.0 | 24 | 0.9 |
| | Sm | 6.4 | 1.3 | 44 | 0.5 |
| | Y | 3.4 | 2.4 | >20 | <1.1 |
| | Zr | 652 | 0.01 | 597 | 0.04 |
| | $HNO_3$ | 0.15 | | 0.04 | |

This table shows that the extraction step allows extraction of the major portion of metal elements present in the raffinate since the distribution coefficients of these elements are all greater than 3. Also, by using, on an industrial scale, an extractor with 8 stages and an O/A (organic over aqueous) flow rate ratio equal to or greater than 1, it should be possible to extract in an organic phase more than 99.9% of the metal elements initially present in the raffinate.

The washing step has the goal of having nitric acid, which was able to be extracted together with the metal elements, return to the aqueous phase.

Now, the distribution coefficients for nitric acid given in Table II show that this acid is not very extractible with the DMDOHEMA/HDEHP mixture. At the end of the washing step, the nitric acid concentration of the organic phase is less than $5\times10^{-3}$ mol/L which is negligible.

On the other hand, the distribution coefficients of the metal elements are all greater than 2, which means that these elements in majority remain in the organic phase.

Selective Stripping of Americium:

Tests in tubes are conducted by using:
the organic phase from the test dealing with the washing performed previously and therefore containing $^{241}$Am, $^{244}$Cm, Ce, Eu, Fe, Gd, La, Mo, Nd, Pd, Pr, Sm, Y and Zr; and
an aqueous phase containing 0.1 mol/L of nitric acid and 0.001 mol/L of $H_4$TPAEN.

Both of these phases are put into contact with each other, volume to volume, and left with stirring for ten minutes at a constant temperature of 25° C.

After decantation and separation of the organic and aqueous phases, the activities of americium 241 and of curium 244 are measured by α spectrometry in each of these phases while the concentrations of the other metal elements are measured by ICP-AES in the aqueous phase alone.

The distribution coefficients of americium 241 and of curium 244 are determined by calculating the (activity in the organic phase)/(activity in the aqueous phase) ratio.

The distribution coefficients of the other metal elements are determined by calculating the (concentration in the organic phase)/(concentration in the aqueous phase) ratio, the concentration in the organic phase being estimated by stripping these elements in a strongly complexing nitric aqueous phase ($HNO_3$=1 mol/L; TEDGA=0.2 mol/L; oxalic acid=0.5 mol/L; 1 volume of organic phase for 1 volume of aqueous phase; duration of the stirring=10 minutes; temperature=25° C.) and by measuring by ICP-AES the concentration of said elements in the aqueous phase stemming from the stripping.

Table III hereafter shows the distribution coefficients ($D_M$) and the thereby obtained separation factors ($FS_{Am/M}$).

TABLE III

| Elements | $D_M$ | $FS_{Am/M}$ |
|---|---|---|
| $^{241}$Am | 1.1 | |
| $^{244}$Cm | 3.0 | 2.7 |
| Ce | 8.9 | 7.9 |
| Eu | 51 | 45 |
| Fe | >200 | >150 |
| Gd | 30 | 27 |
| La | 5.2 | 4.6 |
| Mo | 226 | 200 |
| Nd | 11 | 10 |
| Pd | 0.32 | 0.3 |
| Pr | 10 | 9 |
| Sm | 23 | 20 |
| Y | >30 | >25 |
| Zr | >600 | >540 |

This table shows that the separation factors between americium 241 and the other metal elements are all greater than 2.5 except for palladium which is better stripped from the organic phase than americium.

It is therefore necessary, if it is intended to prevent stripped americium from being contaminated with palladium, to use during the extraction and washing steps which precede the selective stripping step of americium, a complexing agent giving the possibility of inhibiting extraction of the palladium, for example HEDTA as described in Example 1 hereinbefore.

Complexation of palladium by HEDTA has already been validated on a real solution with high activity in reference [14].

Table III also shows that except for palladium, lanthanides and curium 244 are elements which are less well separated from americium.

This is why an additional test is conducted by using:
- a first nitric aqueous phase S1, containing 0.001 mol/L of H$_4$TPAEN, as well as Ce, Eu, Gd, La, Nd, Pr, Sm and Y dissolved in the form of nitrates and for which the pH was adjusted to 1;
- a second nitric aqueous phase S2, only differing from phase S1 in that its pH has been adjusted to 2; and
- an organic phase containing 0.6 mol/L of DMDOHEMA and 0.3 mol/L of HDEHP in TPH, having been used for extracting americium 241, curium 244, cerium 139 and europium 152 from an aqueous solution containing 4 mol/L of nitric acid and having been washed at the end of this extraction with distilled water; the cation concentrations of this organic phase, as measured by γ spectrometry at the end of this washing, are the following:

[$^{152}$Eu]=10$^{-3}$ mg/L

[$^{139}$Ce]=2.7×10$^{-6}$ mg/L

[$^{241}$Am]=9.5×10$^{-2}$ mg/L, and

[$^{244}$Cm]=1.3×10$^{-3}$ mg/L.

The initial concentrations of metal elements in the phases S1 and S2 as determined by ICP-AES are shown in Table IV hereafter.

TABLE IV

| Elements | Concentrations (mg/L) | |
| --- | --- | --- |
| | S1 | S2 |
| Ce | 377 | 393 |
| Eu | 24 | 25 |
| Gd | 23 | 24 |
| La | 189 | 195 |
| Nd | 642 | 668 |
| Pr | 154 | 159 |
| Sm | 142 | 148 |
| Y | 62 | 65 |

The phases S1 and S2 are put into contact in parallel, volume to volume, with a fraction of the organic phase and left with stirring with it for 15 minutes at a constant temperature of 25° C.

After decantation and separation of the organic and aqueous phases, the activities of americium 241, curium 244, cerium 139 and europium 152 are measured, by α and γ spectrometry respectively, in each of these phases while the concentrations of the other metal elements (Ce, Eu, Gd, La, Nd, Pr, Sm, Y) are measured by ICP-AES in the aqueous phase alone.

The distribution coefficients of americium 241, curium 244, cerium 139 and europium 152 are determined by calculating the (activity in the organic phase)/(activity in the aqueous phase) ratio.

The distribution coefficients of the other metal elements are determined by calculating the (concentration in the organic phase)/(concentration in the aqueous phase) ratio, the concentration in the organic phase being estimated by stripping these elements in a strongly complexing nitric aqueous phase (HNO$_3$=1 mol/L; TEDGA=0.2 mol/L; oxalic acid=0.5 mol/L; 1 volume of organic phase for 1 volume of aqueous phase; duration of the stirring=10 minutes; temperature=25° C.) and by measuring with ICP-AES the concentration of said elements in the aqueous phase stemming from this stripping.

Table V hereafter shows the distribution coefficients (D$_M$) and the thereby obtained separation factors (FS$_{Am/M}$) for each of the phases S1 and S2.

TABLE V

| | S1 Final pH = 1 | | S2 final pH = 1.5 | |
| --- | --- | --- | --- | --- |
| Elements | D$_M$ | FS$_{M/Am}$ | D$_M$ | FS$_{M/Am}$ |
| $^{241}$Am | 0.30 | | 0.19 | |
| $^{244}$Cm | 0.70 | 2.3 | 0.57 | 3.0 |
| $^{139}$Ce | 2.4 | 8.0 | 6.6 | 35 |
| Ce | 2.4 | 7.9 | 6.5 | 35 |
| $^{152}$Eu | 10 | 32 | 129 | 685 |
| Eu | 12 | 38 | >20 | >100 |
| Gd | 16 | 54 | >20 | >100 |
| La | 1.1 | 3.7 | 6.9 | 37 |
| Nd | 3.4 | 11 | 9.2 | 49 |
| Pr | 3.0 | 10 | 7.3 | 39 |
| Sm | 6.6 | 22 | 35 | 188 |
| Y | >30 | >100 | >30 | >150 |

This table shows that the distribution coefficients of cerium 139 and of europium 152 initially present in the organic phase are equivalent to those of cerium and of europium initially present in the aqueous phase. This means that there is reversibility between the extraction and the stripping of the lanthanides in the presence of H$_4$TPAEN. These results may therefore be compared with those shown in Table III hereinbefore and which have been obtained for elements which were initially in the organic phase.

This additional test confirms that it is possible to separate americium from curium, from lanthanides and from yttrium by means of a nitric aqueous phase containing 0.001 mol/L of H$_4$TPAEN. It also shows that under the operating conditions used in this test, the distribution coefficient of americium is less than 0.4.

The application on an industrial scale of the step of selective stripping of americium by using a nitric aqueous solution with a pH from 1 to 1.5 containing 0.001 mol/L of H$_4$TPAEN, and an O/A flow rate ratio from 1 to 2 on 32 stages should therefore allow recovery of more than 99% of the extracted americium with less than 1% of curium and extracted lanthanides.

Stripping of the Other Metal Elements:

Tests in tubes are conducted by using:
- the organic phase from the test dealing with the stripping of americium, conducted earlier and therefore containing $^{244}$Cm, Ce, Eu, Fe, Gd, La, Mo, Nd, Pr, Sm, Y and Zr; and
- an aqueous phase containing 1 mol/L of nitric acid, 0.2 mol/L of TEDGA and 0.8 mol/L of oxalic acid.

Both of these phases are put into contact with each other, volume to volume, and the whole is left with stirring for 10 minutes at a constant temperature of 25° C.

After decantation and separation of the organic and aqueous phases, the activity of curium 244 is measured by α spectrometry in each of these phases while the concentrations of the other metal elements are measured by ICP-AES in the aqueous phase alone.

The distribution coefficient of curium 244 is determined by calculating the (activity in the organic phase)/(activity in the aqueous phase) ratio while the distribution coefficients of the other metal elements are determined by calculating the (concentration in the organic phase)/(concentration in the aqueous phase) ratio, the concentration in the organic phase being estimated by stripping these metal elements into a strongly complexing nitric aqueous phase (HNO$_3$=1 mol/L;

TEDGA=0.2 mol/L; oxalic acid=0.5 mol/L; 1 volume of organic phase for 1 volume of aqueous phase; duration of the stirring=10 minutes; temperature=25° C.) and by measuring with ICP-AES their concentration in the aqueous phase stemming from this stripping.

Table VI hereafter shows the thereby obtained distribution coefficients ($D_M$).

TABLE VI

| Elements | $D_M$ |
|---|---|
| $^{244}$Cm | 0.008 |
| Ce | 0.001 |
| Eu | 0.009 |
| Fe | 0.04 |
| Gd | 0.02 |
| La | 0.005 |
| Mo | 0.03 |
| Nd | 0.001 |
| Pr | 0.002 |
| Sm | 0.006 |
| Y | 0.015 |
| Zr | 0.005 |

This table shows that the distribution coefficients are much less than 0.1 for all the metal elements. This means that it should be possible to obtain on an industrial scale, quantitative stripping of all these elements by using an aqueous solution with 1 mol/L of nitric acid, 0.2 mol/L of TEDGA and 0.8 mol/L of oxalic acid, and an O/A flow rate ratio of the order of 10 on only 4 stages.

3) Experimental Validation of the Process Described in Example 2

The first, second and fifth steps of the process described in Example 2 having already been validated by implementation in centrifugal extractors (reference [9]), the tests reported here are only intended to validate the possibility of achieving selective stripping of americium in this process by complexation with $H_4$TPAEN.

Two tests are conducted, one for testing the behavior of americium, curium, lanthanum and europium and the other one for measuring the efficiency of the americium/californium separation.

Selectivity of the Stripping of Americium Towards Curium, Lanthanum and Europium:

This test is conducted by using an organic phase containing 0.1 mol/L of TODGA in TPH.

This organic phase is first of all put into contact, volume to volume, with an aqueous phase of the following composition:

[Eu]=$6.5 \times 10^{-5}$ mol/L;

[La]=$5.8 \times 10^{-5}$ mol/L;

Trace amounts of $^{241}$Am, $^{244}$Cm and $^{152}$Eu;

[NaNO$_3$]=3 mol/L.

The europium and lanthanum are dissolved in this phase in the form of nitrates and their concentration is measured by ICP-AES.

The pH is adjusted to 2 by adding NaOH.

The organic and aqueous phases are left with stirring for 15 minutes at a constant temperature of 25° C.

After decantation and separation of the organic phase from the aqueous phase, the activities of americium 241, curium 244, and europium 152 are measured by α and γ spectrometry, respectively, in each of these phases. In parallel, the concentrations of the other metal elements are measured by ICP-AES in the aqueous phase alone.

The obtained results show that the major portion of these metal elements is extracted into the organic phase.

An organic phase containing 0.1 mol/L of TODGA in TPH, trace amounts of $^{241}$Am, $^{244}$Cm and of $^{152}$Eu, $5 \times 10^{-5}$ mol/L or europium (inactive) and $5.8 \times 10^{-5}$ mol/L of lanthanum is put into contact, volume to volume, with aqueous phases containing $6.5 \times 10^{-4}$ mol/L of $H_4$TPAEN, 3 mol/L of NaNO$_3$ in nitric acid with a molarity ranging from 0.03 to 0.045.

The organic and aqueous phases are left with stirring for 15 minutes at a constant temperature of 25° C.

After decantation and separation of the organic and aqueous phase, the activities of americium 241, curium 244, and europium 152 are measured, by α and γ spectrometry, respectively, in each of these phases while the concentrations of lanthanum and europium (inactive) are measured with ICP-AES in the aqueous phases alone.

The distribution coefficients of curium 244 and europium 152 are determined by calculating the (activity in the organic phase)/(activity in the aqueous phase) ratio while the distribution coefficients of lanthanum and of europium (inactive) are determined by calculating the (initial concentration−final concentration)/(initial concentration) ratio.

Table VII hereafter shows the distribution coefficients ($D_M$) and the thereby obtained separation factors ($FS_{M/Am}$) according to the nitric acid concentration exhibited by the aqueous phases at the end of the stripping of americium.

TABLE VII

| Metal | [HNO$_3$]$_{final}$ = 0.023 mol/L | | [HNO$_3$]$_{final}$ = 0.035 mol/L | | [HNO$_3$]$_{final}$ = 0.044 mol/L | |
|---|---|---|---|---|---|---|
| elements | $D_M$ | $FS_{M/Am}$ | $D_M$ | $FS_{M/Am}$ | $D_M$ | $FS_{M/Am}$ |
| $^{241}$Am | 0.090 | | 0.58 | | 1.1 | |
| $^{244}$Cm | 0.33 | 3.7 | 2.1 | 3.6 | 3.9 | 3.6 |
| $^{152}$Eu | 63 | 700 | 159 | 290 | 202 | 177 |
| La | 1.3 | 15 | 3.8 | 6.6 | 7.4 | 6.7 |
| Eu | 38 | 424 | 97 | 168 | 125 | 114 |

This table confirms that, within the scope of a TODG process, curium 244 is the most difficult element to separate from americium 241.

However, as the separation factor between curium and americium is greater than 3.5 and this regardless of the acidity of the aqueous phase, it should be possible to recover more than 99% of the americium selectively from the other elements with an extractor with at least 30 stages.

Selectivity of the Stripping of Americium with Respect to Californium:

This test is conducted by using an organic phase containing 0.2 mol/L of TODGA and 0.5 mol/L of TBP in TPH. The TBP is used as a phase modifying agent.

In a first phase, this organic phase is put into contact, volume to volume, with an aqueous phase of the following composition:

$^{249}$Cf=8,500 kBq/L=$2.4 \times 10^{-2}$ mg/L;

$^{241}$Am=10,000 kBq/L=$7.9 \times 10^{-2}$ mg/L;

$^{152}$Eu=11,300 kBq/L=$1.8 \times 10^{-3}$ mg/L;

[HNO$_3$]=3 mol/L;

and the whole is left with stirring for 30 minutes at a constant temperature of 25° C. This operation has the purpose of extracting the radiotracers in the organic phase.

Next, after decantation and separation of the organic and aqueous phases, the organic phase is put into contact, volume to volume, with an aqueous phase containing 0.01 mol/L of nitric acid and the whole is left with stirring for 30 minutes at a constant temperature of 25° C. This operation has the purpose of stripping the nitric acid which may have been extracted during the previous operation.

After decantation and separation of the organic and aqueous phases, the activities of americium 241, californium 249 and of europium 152 are measured, by $\alpha$ and $\gamma$ spectrometry, respectively, in each of these phases.

The obtained results show that the major portion of these radiotracers has been extracted in the organic phase.

The thereby obtained organic phase which therefore contains trace amounts of $^{241}$Am, $^{249}$Cf and $^{152}$Eu is then put into contact, volume to volume, with an aqueous phase containing 0.1 mol/L of nitric acid and 0.001 mol/L of H$_4$TPAEN and the whole is left with stirring for 30 minutes at a constant temperature of 25° C.

After decantation and separation of the organic and aqueous phases, the activities of americium 241, californium 249 and of europium 152 are measured by $\alpha$ and $\gamma$ spectrometry, respectively, in each of these phases and their distribution coefficients are determined by calculating the (activity in the organic phase)/(activity in the aqueous phase) ratio.

Table VIII hereafter shows the distribution coefficients ($D_M$) and the thereby obtained separation factors ($FS_{M/Am}$).

TABLE VIII

| Elements | [HNO$_3$]$_{final}$ = 0.14 mol/L | |
|---|---|---|
| | $D_M$ | $FS_{M/Am}$ |
| $^{241}$Am | 0.075 | |
| $^{249}$Cf | 2.6 | 34 |
| $^{152}$Eu | 3.2 | 43 |

This table shows that it is possible to separate americium from californium by means of an aqueous phase containing 0.001 mol/L of H$_4$TPAEN, even with nitric acidity of 0.14 mol/L.

The advantage of being able to use such an acidity is dual, i.e.:
that of suppressing the requirement of using a buffer system for stabilizing the pH of the aqueous phase used for the stripping, and
that, in the case of selective stripping of americium, of suppressing the requirement of using a desalting salt such as sodium nitrate, capable of increasing the distribution coefficients of the elements which do not have to be stripped.

The aqueous phase may therefore only consist of H$_4$TPAEN, nitric acid and water.

The distribution coefficient of americium is less than 0.1 while the separation factor between californium and americium is greater than 40.

The application on an industrial scale of the step of selective stripping of americium by using a nitric aqueous solution with a pH from 1 to 1.5, containing 0.001 mol/L of H$_4$TPAEN, and an O/A flow rate ratio close to 3 on 12 stages should therefore give the possibility of recovering 99.9% of the extracted americium with less than 0.1% of extracted californium.

QUOTED REFERENCES

[1] International PCT application WO 2007/135178
[2] French patent application 2 890 657
[3] R. B. Gujar, S. A. Ansari, M. S. Murali, P. K. Mohapatra, V. K. Manchanda, *J. Radioanal. Nucl. Chem.* 284, 377-385 (2010)
[4] R. B. Gujar, S. A. Ansari, P. K. Mohapatra, V. K. Manchanda, *Solv. Ext. Ion Exch.*, 28, 350-366 (2010)
[5] S. A. Ansari, P. N. Pathak, V. K. Manchanda, M. Husain, A. K. Prasad, V. S. Parmar, *Solv. Ext. Ion Exch.*, 23, 463-479 (2005)
[6] S. Tachimori, S. Susuki, Y. Sasaki, A. Apichaibukol, *Solv. Ext. Ion Exch.*, 21(5), 707-715 (2003)
[7] G. Modolo, H. Asp, H. Vijgen, R. Malmbeck, D. Magnusson, C. Sorel, *Solv. Ext. Ion Exch.*, 26, 62-76 (2008)
[8] Y. Sasaki, Y. Morita, Y. Kitatsuji, T. Kimura, *Solv. Ext. Ion Exch.*, 28, 335-349 (2010)
[9] M. C. Charbonnel, C. Nicol, L. Berthon, P. Baron, Proceedings of the International Conference GLOBAL '97, Yokohama, Japan (1997).
[10] L. Spjuth, J. O. Liljenzin, M. Skålberg, M. J. Hudson, G. Y. S. Chan, M. G. B. Drew, M. Feaviour, P. B. Iveson, C. Madic, *Radiochimica Acta*, 78, 39-46 (1997)
[11] French patent application 2 845 616
[12] P. Baron, X. Hérès, M. Lecomte, M. Masson, <<Separation of the Minor Actinides: the DIAMEX-SANEX Concept>>, Proceedings of the International Conference GLOBAL '01, Paris, France (2001)
[13] P. S. Dhami, R. R. Chitnis, V. Gopalakrishnan, P. K. Wattal, A. Ramnujam, A. K. Bauri, *Sep. Sci. Technol.*, 36(2), 325-335 (2001)
[14] B. Weaver, F. A. Kappelmann, <<TALSPEAK: A New Process of Separating Americium and Curium from the Lanthanides by Extraction from an Aqueous Solution of Aminopolyacetic Acid Complex with a Monoacidic Organophosphate or Phosphonate>>, Rapport ORNL-3559 (1964)
[15] M. Kubota, Y. Morita, R. Tatsugae, T. Fujiwara, Y. Kondo, <<Development of Partitioning Process at JAERI>>, Third International Information Exchange Meeting on Actinide and Fission Product Partitioning and Transmutation, Cadarache, France (1994).
[16] S. Tachimori, A. Sato, H. Nakamura, *J. Nucl. Sci. Technol.*, 16(6), 434 (1979)
[17] M. Kubota, Y. Morita, <<Preliminary assessment on four group partitioning process developed in JAERI>>, Proceedings of the International Conference GLOBAL '97, Yokohama, Japan (1997)
[18] Y. Morita, J. P. Glatz, M. Kubota, L. Koch, G. Pagliosa, K. Roemer, A. Nicholl, *Solv. Ext. Ion Exch.*, 14(3), 385-400 (1996)
[19] J. Yamagawa, M. Goto, F. Nakashio, *Solv. Ext. and Res. Dev.*, 4, 12-22 (1997)
[20] S. D. Chaudhary, P. S. Dhami, V. Gopalakrishnan, A. Ramanujam, J. N. Mathur, <<Solvent extraction of trivalent actinides and lanthanides from various aqueous media using KSM-17>>, NUCAR 97: Nuclear and Radiochemistry Symposium. Department of Atomic Energy, Bombay, India (1997)
[21] P. N. Pathak, R. Veeraraghavan, P. K. Mohapatra, V. K. Manchanda, <<Use of 3-phenyl-4-benzoyl-5-isoxazolone for the recovery of americium(III) from simulated nuclear waste solution>>, NUCAR 97: Nuclear and Radiochemistry Symposium, Department of Atomic Energy, Bombay, India (1997)
[22] M. L. P. Reddy, R. L. Varma, T. R. Ramamohan, T. P. Rao, C. S. P. Iyer, A. D. Damodaran, J. N. Mathur, M. S. Murali, R. H. Iyer, *Radiochimica Acta*, 69, 55-60 (1995)
[23] French patent application 2 738 663

[24] Y. Koma, M. Watanabe, S. Nemoto, Y. Tanaka, *J. Nucl. Sci. Technol.*, 35(2), 130-136 (1998)
[25] J. D. Law, T. G. Garn, D. H. Meikrantz, J. Warburton, *Sep. Sci. Technol.*, 45, 1769-1775 (2010)
[26] K. Arai, M. Yamashita, M. Hatta, *Nucl. Sci. Techn.*, 34(5), 521-526 (1997)
[27] Y. Zhu, C. Song, *Nucl. Technol.*, 108, 361 (1994)
[28] E. M. Bond, U. Engelhardt, T. P Deere, B. M. Rapko, R. T. Paine, J. R. FitzPatrick, *Solv. Ext. Ion Exch.*, 16(4), 967-983 (1998)
[29] L. Rao, Y. Xia, B. M. Rapko, P. F. Martin, *Solv. Ext. Ion Exch.*, 16(4), 913-929 (1998)
[30] German patent application 198 10 895
[31] D. Magnusson, B. Christiansen, R. S. Foreman, A. Geist, J. P. Glatz, R. Malmbeck, G. Modolo, D. Serrano-Purroy, C. Sorel, *Solv. Ext. Ion Exch.*, 27(2), 97-106 (2009)
[32] B. Christiansen, C. Apostolidis, R. Carlos, O. Courson, J. P. Glatz, R. Malmbeck, G. Pagliosa, K. Römer, D. Serrano-Purroy, *Radiochim. Acta*, 92, 475-480 (2004)
[33] G. Modolo, S, Nabet, *Solv. Ext. Ion Exch.*, 23(3), 359-373 (2005)
[34] J. Chen, R. Jiao, Y. Zhu, *Radiochimica Acta*, 76, 129-130 (1997)
[35] D. R. Peterman, M. R. Greenhalgh, R. D. Tillotson, J. R. Klaehn, M. K. Harrup, T. A. Luther, J. D. Law, *Sep. Sci. Technol.*, 45(12), 1711-1717 (2010)

The invention claimed is:

1. A process for separating americium from other metal elements present in a phase P1, which comprises one or more operations each comprising putting the phase P1 in contact with a phase P2 which is not miscible with the phase P1, and then separating the phase P1 from the phase P2, one of the phases P1 and P2 being an acid aqueous phase and the other one of the phases P1 and P2 being an organic phase which comprises at least one extractant in an organic diluent, and in which the acid aqueous phase contains an ethylenediamine derivative fitting the general formula (I) hereafter:

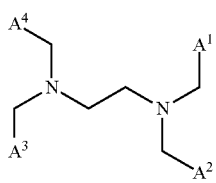

(I)

wherein $A^1$, $A^2$, $A^3$ and $A^4$, which are identical or different, represent a group of general formula (II) hereafter:

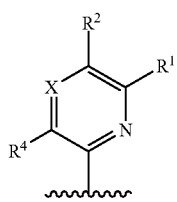

(II)

wherein:
either X represents a nitrogen atom, in which case one of the $R^1$, $R^2$ and $R^4$ represent a complexing group selected from the groups —COOH, —SO$_3$H, —PO$_3$H$_2$, —CONH$_2$ and —CON(CH$_3$)$_2$, while the other ones of $R^1$, $R^2$ and $R^4$ represent independently of each other, a hydrogen atom or a group selected from the groups —OH, —NH$_2$, —N(CH$_3$)$_2$, —COOH, —COOCH$_3$, —CONH$_2$, —CON(CH$_3$)$_2$, —SO$_3$H, —SO$_3$CH$_3$, —PO$_3$H$_2$, —PO(OCH$_3$)$_2$, —O(CH$_2$CH$_2$)$_n$—OH and —O(CH$_2$CH$_2$)$_n$—OCH$_3$ wherein n is an integer equal to or greater than 1;
or X represents a carbon atom bearing a hydrogen atom or a group $R^3$, in which case one of $R^1$, $R^2$, $R^3$ and $R^4$ represents a complexing group selected from the groups —COOH, —SO$_3$H, —PO$_3$H$_2$, —CONH$_2$ and —CON(CH$_3$)$_2$, while the other ones of $R^1$, $R^2$, $R^3$ and $R^4$ represent, independently of each other, a hydrogen atom or a group selected from the groups —OH, —NH$_2$, —N(CH$_3$)$_2$, —COOH, —COOCH$_3$, —CONH$_2$, —CON(CH$_3$)$_2$, —SO$_3$H, —SO$_3$CH$_3$, —PO$_3$H$_2$, —PO(OCH$_3$)$_2$, —O(CH$_2$CH$_2$)$_n$—OH and —O(CH$_2$CH$_2$)$_n$—OCH$_3$ wherein n is an integer equal to or greater than 1;
or a salt of the ethylenediamine derivative.

2. The process according to claim 1, in which, in general formula (I), $A^1$, $A^2$, $A^3$ and $A^4$ all represent a group of general formula (II) wherein X represents a nitrogen atom, or a carbon atom bearing a hydrogen atom, a group —OH or a group —O(CH$_2$CH$_2$)$_n$—OH wherein n is an integer equal to or greater than 1.

3. The process according to claim 1, in which, in general formula (II), $R^1$ represents a complexing group —COOH.

4. The process according to claim 3, in which, in general formula (II), $R^2$ and $R^4$ represent a hydrogen atom.

5. The process according to claim 1, in which, in the general formula (I), $A^1$, $A^2$, $A^3$ and $A^4$ are identical with each other.

6. The process according to claim 1, in which the ethylenediamine derivative of general formula (I) is selected from:
N,N,N',N'-tetrakis[-carboxypyridin-2-yl)methyl]ethylenediamine;
N,N,N',N'-tetrakis[(6-carboxy-4-hydroxypyridin-2-yl)methyl]ethylene-diamine;
N,N,N',N'-tetrakis[(6-carboxy-4-polyethyleneglycolpyridin-2-yl)methyl]-ethylenediamines; and
N,N,N',N'-tetrakis[(6-carboxypyrazin-2-yl)methyl]ethylenediamine.

7. The process according to claim 1, in which the acid aqueous phase is a nitric aqueous phase comprising from 0.001 to 3 mol/L of nitric acid.

8. The process according to claim 1, in which the ethylenediamine derivative of general formula (I) or salt thereof is present in the acid aqueous phase at a concentration ranging from $10^{-5}$ to $10^{-1}$ mol/L.

9. The process according to claim 1, in which the extractant(s) present in the organic phase is (are) selected from solvating extractants and cation exchange extractants.

10. The process according to claim 9, in which the extractant(s) is (are) selected from malonamides, N,N,N',N'-tetraalkyl-3,6-dioxaoctane-diamides, lipophilic diglycolamides, alkylphosphine oxides, carbamoylphosphine oxides, carbamoylphosphonates, dialkyl sulfides, substituted pyridines, 2,2'-dibenzimidazoles, bisphenylphosphonic acid alkyl esters, alkylphosphoric acids, alkyphosphonates, alkylphosphinic acids, lipophilic carboxylic acids, sulfonic acids, thiophosphoric acids, thiophosphonic acids, thiophosphinic acids, thiophosphinic acids, thiophosphorous acids, lipophilic hydroxyoximes and lipophilic β-diketones.

11. The process according to claim 1, in which the organic phase further comprises at least one phase modifying agent.

12. A process for selectively recovering americium from a first acid aqueous phase comprising americium and other metal elements, the process comprising a step of separating americium from the other metal elements present in a phase P1, which comprises one or more operations each comprising putting the phase P1 in contact with a phase P2 which is not miscible with the phase P1, and then separating the phase P1 from the phase P2, one of the phases P1 and P2 being the first acid aqueous phase or a second acid aqueous phase and the other one of the phases P1 and P2 being an organic phase which comprises at least one extractant in an organic diluent, and in which the first or second acid aqueous phase comprises an ethylenediamine derivative fitting general formula (I) hereafter:

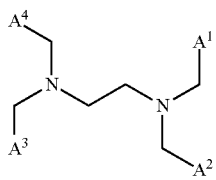

(I)

wherein $A^1$, $A^2$, $A^3$ and $A^4$, which are identical or different, represent a group of general formula (II) hereafter:

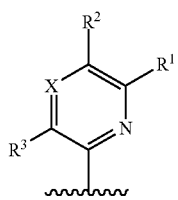

(II)

wherein:
either X represents a nitrogen atom, in which case one of the $R^1$, $R^2$ and $R^4$ represent a complexing group selected from the groups —COOH, —SO$_3$H, —PO$_3$H$_2$, —CONH$_2$ and —CON(CH$_3$)$_2$, while the other ones of $R^1$, $R^2$ and $R^4$ represent independently of each other, a hydrogen atom or a group selected from the groups —OH, —NH$_2$, —N(CH$_3$)$_2$, —COOH, —COOCH$_3$, —CONH$_2$, —CON(CH$_3$)$_2$, —SO$_3$H, —SO$_3$CH$_3$, —PO$_3$H$_2$, —PO(OCH$_3$)$_2$, —O(CH$_2$CH$_2$)$_n$—OH and —O(CH$_2$CH$_2$)$_n$—OCH$_3$ wherein n is an integer equal to or greater than 1;
or X represents a carbon atom bearing a hydrogen atom or a group $R^3$, in which case one of $R^1$, $R^2$, $R^3$ and $R^4$ represents a complexing group selected from the groups —COOH, —SO$_3$H, —PO$_3$H$_2$, —CONH$_2$ and —CON(CH$_3$)$_2$, while the other ones of $R^1$, $R^2$, $R^3$ and $R^4$ represent, independently of each other, a hydrogen atom or a group selected from the groups —OH, —NH$_2$, —N(CH$_3$)$_2$, —COOH, —COOCH$_3$, —CONH$_2$, —CON(CH$_3$)$_2$, —SO$_3$H, —SO$_3$CH$_3$, —PO$_3$H$_2$, —PO(OCH$_3$)$_2$, —O(CH$_2$CH$_2$)$_n$—OH and —O(CH$_2$CH$_2$)$_n$—OCH$_3$ wherein n is an integer equal to or greater than 1; or a salt of the ethylenediamine derivative.

13. The process according to claim 12, in which the first acid aqueous phase is a nitric aqueous phase which comprises as other metal elements at least curium and fission products including lanthanides, and is free of uranium, plutonium and neptunium or comprises uranium, plutonium and neptunium as trace amounts.

14. The process according to claim 13, in which the nitric aqueous phase is a raffinate stemming from a first purification cycle of a process for processing used nuclear fuels PUREX or COEX.

15. The process according to claim 12, which comprises at least the following steps:
a) extraction of the americium and of all or part of the other metal elements from the first acid aqueous phase, the extraction comprising at least one operation in which the first acid aqueous phase is put into contact with an organic phase which is non-miscible with the first acid aqueous phase, the organic phase comprising at least one extractant in an organic diluent, and then the first acid aqueous phase is separated from the organic phase; and
b) selective stripping of the americium from the organic phase stemming from step a), the stripping comprising at least one operation in which the organic phase is put into contact with the second acid aqueous phase, the second aqueous phase comprising the ethylenediamine derivative of general formula (I) or the salt thereof, and then the organic phase is separated from the second acid aqueous phase.

16. The process according to claim 15, in which the first acid aqueous phase subject to step a) comprises at least one complexing agent.

17. The process according to claim 15, in which:
step a) further comprises, after the separation of the organic phase from the first acid aqueous phase, at least one operation of washing the organic phase with a third acid aqueous phase; and/or
step b) further comprises, after the separation of the organic phase from the second acid aqueous phase, at least one operation of washing the second acid aqueous phase with an organic phase having the same composition as the one organic phase used in step a).

18. The process according to claim 15, which further comprises a step c) of stripping the other metal elements from the organic phase stemming from step b), the stripping comprising at least one operation in which the organic phase is put into contact with a fourth acid aqueous phase and then the organic phase is separated from the fourth acid aqueous phase.

19. The process according to claim 15, in which the organic phase used in step a) comprises a mixture of a malonamide and of an alkylphosphoric acid, or a diglycolamide extractant.

20. The process according to claim 12, which comprises at least one step a) of selective extraction of all the other metal elements from the first acid aqueous phase, the extraction comprising at least one operation in which the first acid aqueous phase is put into contact with an organic phase which is non-miscible with the first acid aqueous phase, the organic phase comprising at least one extractant in an organic diluent, and then the first acid aqueous phase is separated from the organic phase, and the extraction being carried out after or simultaneously to an addition of the ethylenediamine derivative of general formula (I) or the salt thereof to the first acid aqueous phase.

21. The process according to claim 20, in which step a) further comprises, after the separation of the organic phase from the first acid aqueous phases, at least one operation of washing the organic phase, the washing comprising putting the organic phase in contact with a second acid aqueous phase comprising the ethylenediamine derivative of general formula (I) or the salt thereof and then separating the organic phase from the second acid aqueous phase.

22. The process according to claim 20, which further comprises a step b) of stripping the other metal elements from the organic phase stemming from step a), the stripping comprising at least one operation in which the organic phase is put into contact with a third acid aqueous phase, and then the organic phase is separated from this the third acid aqueous phase.

23. The process according to claim 22, in which the third acid aqueous phase used in step b) comprises at least one complexing agent.

24. The process according to claim 20, in which the organic phase used in step a) comprises a mixture of an alkylphosphoric acid extractant and of a phase modifying agent, or a diglycolamide extractant.

25. The process according to claim 12, characterized in that the ethylenediamine derivative of general formula (I) is N,N,N',N'-tetrakis[(6-carboxypyridin-2-yl)methyl]ethylenediamine.

26. The process according to claim 12, characterized in that the ethylenediamine derivative of general formula (I) or the salt thereof is present in the first or second acid aqueous phase at a concentration ranging from $10^{-4}$ to $10^{-2}$ mol/L.

* * * * *